(12) United States Patent
Yamakura et al.

(10) Patent No.: US 8,499,878 B2
(45) Date of Patent: Aug. 6, 2013

(54) MOTORCYCLE REAR PORTION STRUCTURE

(75) Inventors: Yutaka Yamakura, Wako (JP); Jun Hirose, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/580,331

(22) PCT Filed: Feb. 23, 2010

(86) PCT No.: PCT/JP2010/001214
§ 371 (c)(1),
(2), (4) Date: Aug. 21, 2012

(87) PCT Pub. No.: WO2011/104748
PCT Pub. Date: Sep. 1, 2011

(65) Prior Publication Data
US 2012/0320612 A1    Dec. 20, 2012

(51) Int. Cl.
*B62K 19/30* (2006.01)
*B62J 6/04* (2006.01)

(52) U.S. Cl.
USPC ......... 180/219; 180/291; 180/311; 280/281.1

(58) Field of Classification Search
CPC ............ B62K 25/20; B62K 5/05; B62J 1/28; B62D 25/08
USPC ................ 180/219, 291, 311, 215; 280/835
See application file for complete search history.

(56) References Cited

U.S. PATENT DOCUMENTS

| 4,815,555 | A | * | 3/1989 | Kishi et al. | 180/227 |
| 8,443,925 | B2 | * | 5/2013 | Fujiyama et al. | 180/219 |
| 2003/0132048 | A1 | * | 7/2003 | Hata | 180/219 |
| 2009/0079156 | A1 | * | 3/2009 | Ichihara | 280/152.1 |

FOREIGN PATENT DOCUMENTS

| JP | 50-3248 A | 1/1975 |
| JP | 57-58574 A | 4/1982 |
| JP | 4-278888 A | 10/1992 |
| JP | 2002-29475 A | 1/2002 |
| JP | 2009-208774 A | 9/2009 |

* cited by examiner

*Primary Examiner* — Tracie Y Green
(74) *Attorney, Agent, or Firm* — Birch, Stewart, Kolasch & Birch, LLP

(57) ABSTRACT

A rear portion structure (100) of a motorcycle (1) comprises a chassis frame (5); a rear wheel (17) positioned below the rear portion of the chassis frame (5); a fender main body portion (110) anchored to the rear portion of the chassis frame (5) and positioned above the rear wheel (17); a fender hanging portion (120) configured separately from the fender main body portion (110) and covering at least a portion of the rear wheel (17); and a support stay (130) anchored to the rear end portion of the chassis frame (5) (rear end frame portion (5*a*)), extending aft approximately horizontally from the rear end portion, and supporting the fender hanging portion (120).

7 Claims, 24 Drawing Sheets

MOTORCYCLE REAR PORTION STRUCTURE

TECHNICAL FIELD

The present invention relates to a rear portion structure of a motorcycle equipped with a rear fender.

BACKGROUND ART

A motorcycle rear portion structure has been conventionally known that includes a fender main body fixed to a rear portion of the chassis frame and disposed above the rear wheel, and a fender hanging portion that is configured separately from the fender main body and covers part of the rear wheel from behind (e.g., refer to Patent Document 1).

In the above-mentioned motorcycle rear portion structure described in Patent Document 1, the fender hanging portion is configured separately from the fender main body, and is a shape that slopes more upwards moving to the rear of the vehicle.

Patent Document 1: Japanese Unexamined Patent Application, Publication No. 2002-29475

DISCLOSURE OF THE INVENTION

Problems to be Solved by the Invention

However, in recent years, it has been desired to universalize components of the rear portion such as the fender hanging portion for a plurality of vehicle models having different wheel bases, from the view point of a reduction in manufacturing cost, etc.

However, in the above-mentioned motorcycle rear portion structure described in Patent Document 1, the fender hanging portion is configured separately from the fender main body. As a result, in a case of universalizing components of the rear portion such as the fender hanging portion, it has been necessary to change the fixing positions between the fender main body and the fender hanging portion depending on the wheel base. When making such a change in the fixing positions, a wasteful structural change has been unavoidable, which has led to a weight increase in the rear portion structure and an increase in cost, due to an increase in the number of components, etc.

In addition, in the above-mentioned motorcycle rear portion structure described in Patent Document 1, the fender main body is a shape sloping more upwards moving to the rear of the vehicle. As a result, when changing the fixing positions of the fender hanging portion in the front-rear direction in accordance with the wheel base, there has been a problem in that the position of the fender hanging portion in the height direction changes greatly, and the external shape of the motorcycle changes greatly.

The present invention has an object of providing a motorcycle rear portion structure that can achieve universalization of components for a plurality of vehicle models having different wheel bases, without changing the fixing positions of the fender main body and fender hanging portion, as well as being able to achieve a weight reduction in the rear portion structure and a reduction in cost, while keeping the external shape substantially the same.

Means for Solving the Problems

A first aspect of the invention includes: a chassis frame; a rear wheel disposed below a rear portion of the chassis frame; a fender main body that is fixed to the rear portion of the chassis frame and is disposed above the rear wheel; a fender hanging portion that is configured to be separate from the fender main body and covers at least part of the rear wheel from behind; and a support stay that is fixed to a rear end of the chassis frame, extends substantially horizontally from the rear end rearwards, and supports the fender hanging portion.

In addition to the configuration as described in the first aspect, a second aspect of the invention includes: a tail light that is provided above the support stay; and an under cover that is fixed to a front portion of the fender hanging portion and a rear portion of the fender main body to be detachable, and covers the support stay from below.

In addition to the configuration as described in the second aspect, according to a third aspect of the invention, the support stay includes a pair of front-fastening portions that is provided at a front portion thereof to be separated in a vehicle width direction, and is fastened to the chassis frame, and a middle-fastening portion that is provided at a substantially middle part of the support stay in a front-rear direction and is fastened to the chassis frame, and the chassis frame includes a maintenance opening portion at a region surrounded by the pair of front-fastening portions and the middle-fastening portion.

In addition to the configuration as described in the second or third aspect, according to fourth aspect of the invention, the support stay includes a tail-light mounting stay portion that mounts the tail light to the support stay.

In addition to the configuration as described in the fourth aspect, the fifth aspect of the invention further includes: an auxiliary light provided to the fender hanging portion; and a harness that supplies electricity to the auxiliary light and the tail light, in which the support stay includes a pair of rod members disposed in parallel in the vehicle width direction and extending in a vehicle front-rear direction, and a plate member joining the pair of rod members, and at least a part of the harness is disposed between the pair of rod members.

In addition to the configuration as described in the fifth aspect, a sixth aspect of the invention further includes a rear-center cover that is disposed between the tail light and the support stay so as to abut an upper face of the fender hanging portion, and that covers a lower portion of the tail light and an upper portion of the support stay.

In addition to the configuration as described in the sixth aspect, a seventh aspect of the invention further includes a pair of rear-side covers, at both ends of the rear-center cover in the vehicle width direction, covering lateral sides of the tail light and lateral sides of the rear portion of the chassis frame, in which a rear end of the rear-side cover is disposed so as to overlap an upper portion of the fender hanging portion from outside in a side view.

Effects of the Invention

According to the first aspect of the invention, it is possible to change the support position of the fender hanging portion by way of the support stay. As a result, it is possible to achieve universalization of components for a plurality of vehicle models having different wheel bases, without changing the fixing positions of the fender main body and fender hanging portion.

In addition, since the formation of a plurality of fixing locations for dealing with changing of the fixing positions of the fender hanging portion relative to the fender main body becomes unnecessary, it is possible to achieve a weight reduction in the rear portion support and a reduction in cost.

In addition, the support stay supports the fender hanging portion by extending substantially horizontally from the rear end of the chassis frame rearwards. As a result, even if changing the length of the support stay for a plurality of vehicle models having different wheel bases, the position of the fender hanging portion in the height direction will be substantially the same, whereby it is possible to make the external shape of the motorcycle substantially the same.

According to the second aspect of the invention, even in a case of the position of the fender hanging portion in the front-rear direction being changed, it is possible to easily cover the support stay from below by the under cover. In addition, by removing the under cover from the part, it is possible to perform maintenance such as replacement or the like of the bulb of the tail light. Therefore, it is possible to universalize the structures of fenders, without increasing the number of components.

According to the third aspect of the invention, the support stay is fastened at the three places (3 points) of the pair of front-fastening portions and the middle-fastening portion. As a result, it is possible to raise the fastening strength of the support stay. In addition, the chassis frame has the maintenance opening portion at the rear portion thereof. As a result, it is possible to achieve centralization of mass by a weight reduction in the rear portion of vehicle. In addition, it is possible to perform maintenance such as replacement or the like of the bulb of the tail light using the maintenance opening portion.

According to the fourth aspect of the invention, it is possible to make a sub-assembly of the tail light to the tail-light mounting stay portion of the support stay in advance. As a result, the support stay can be assembled to the chassis frame moving down a main line of an assembly process, in an assembly state including the fender hanging portion, whereby the assembly process can be simplified. Therefore, the productivity of the motorcycle can be improved.

According to the fifth aspect of the invention, the harness can be disposed effectively using the space formed in the support stay (between the pair of rod members). As a result, it is possible to achieve a size reduction in the rear portion structure of the motorcycle, as well as being able to protect the harness with the support, the fender hanging portion and under cover. In addition, since it can be made in an assembly state also including the auxiliary lights, the productivity can be further improved.

According to the sixth aspect of the invention, it is possible to suppress exposure on the exterior of the harness and the support stay. As a result, the harness and the support stay can be protected. In addition, the rear-center cover and the upper face of the fender hanging portion merely abut without being fastened. As a result, even if changing the mounting position of the fender hanging portion, it is possible to create a sense of unity around the rear, without forming an abundance of fastening portions.

According to the seventh aspect of the invention, the rear end of the rear-side covers is disposed so as to overlap the upper portion of the fender hanging portion from outside in a side view. As a result, it is possible to conceal a gap (clearance) created at an abutting position between the rear-center cover and the upper face of the fender hanging portion. Therefore, even without fastening the rear-center cover and fender hanging portion, it is possible to improve the aesthetics, and it is possible to achieve a reduction in the number of components and a weight reduction.

Figure 1:
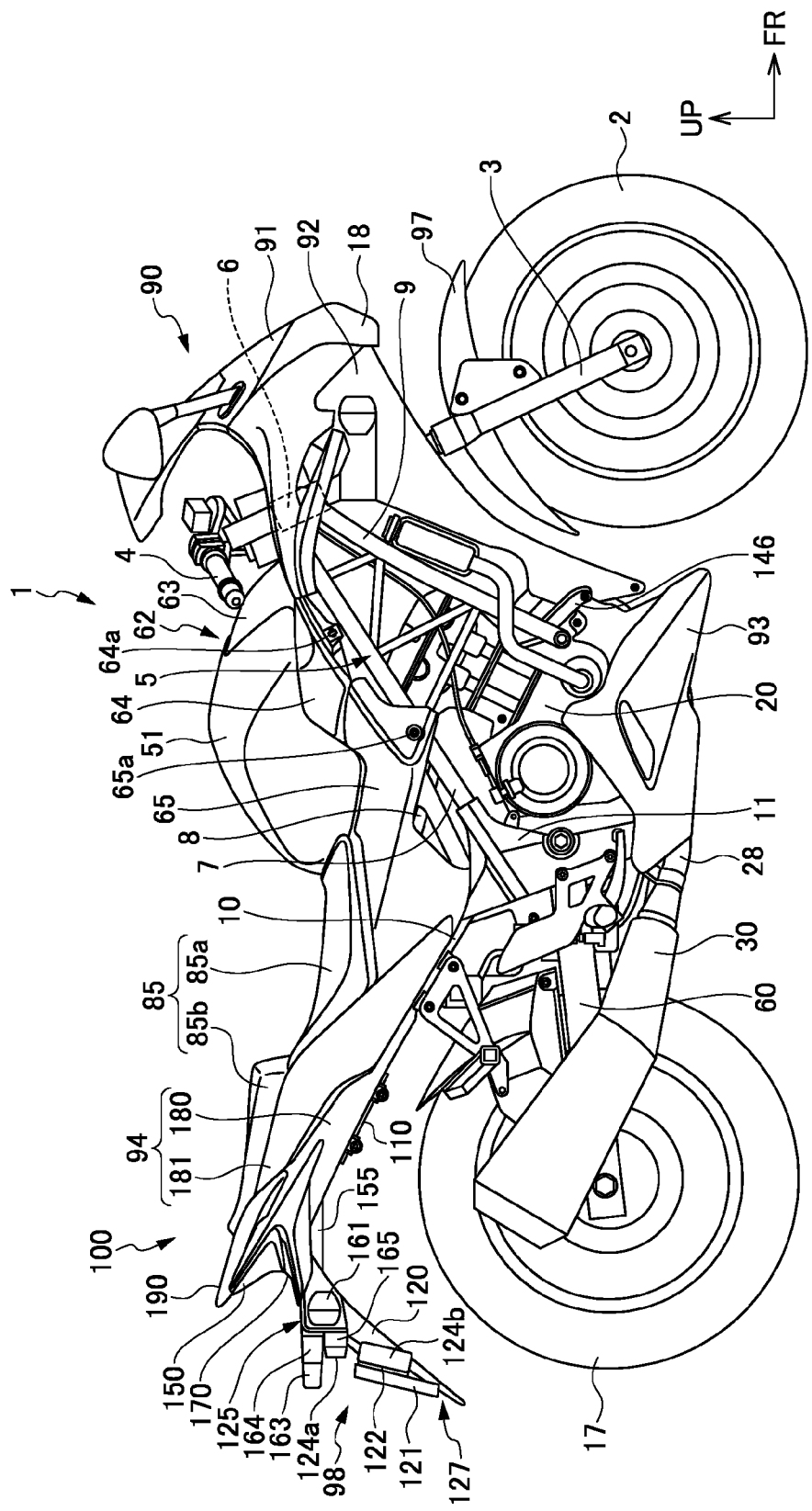
FIG. 1 is a right-side view showing a motorcycle of an embodiment of the present invention.

EXPLANATION OF REFERENCE NUMERALS 1 motorcycle
5 chassis frame
17 rear wheel
100, 100A rear portion structure
110 fender main body
120 fender hanging portion
130, 130A support stay
131 rod member
132 plate member
133 tail-light mounting stay portion
137 front-fastening portion
138 middle-fastening portion
140 maintenance opening portion
150 tail light 155 under cover
160 auxiliary lights
167, 168 harness
170 rear-center cover
180 rear-side cover

PREFERRED MODE FOR CARRYING OUT THE INVENTION

Figure 2:
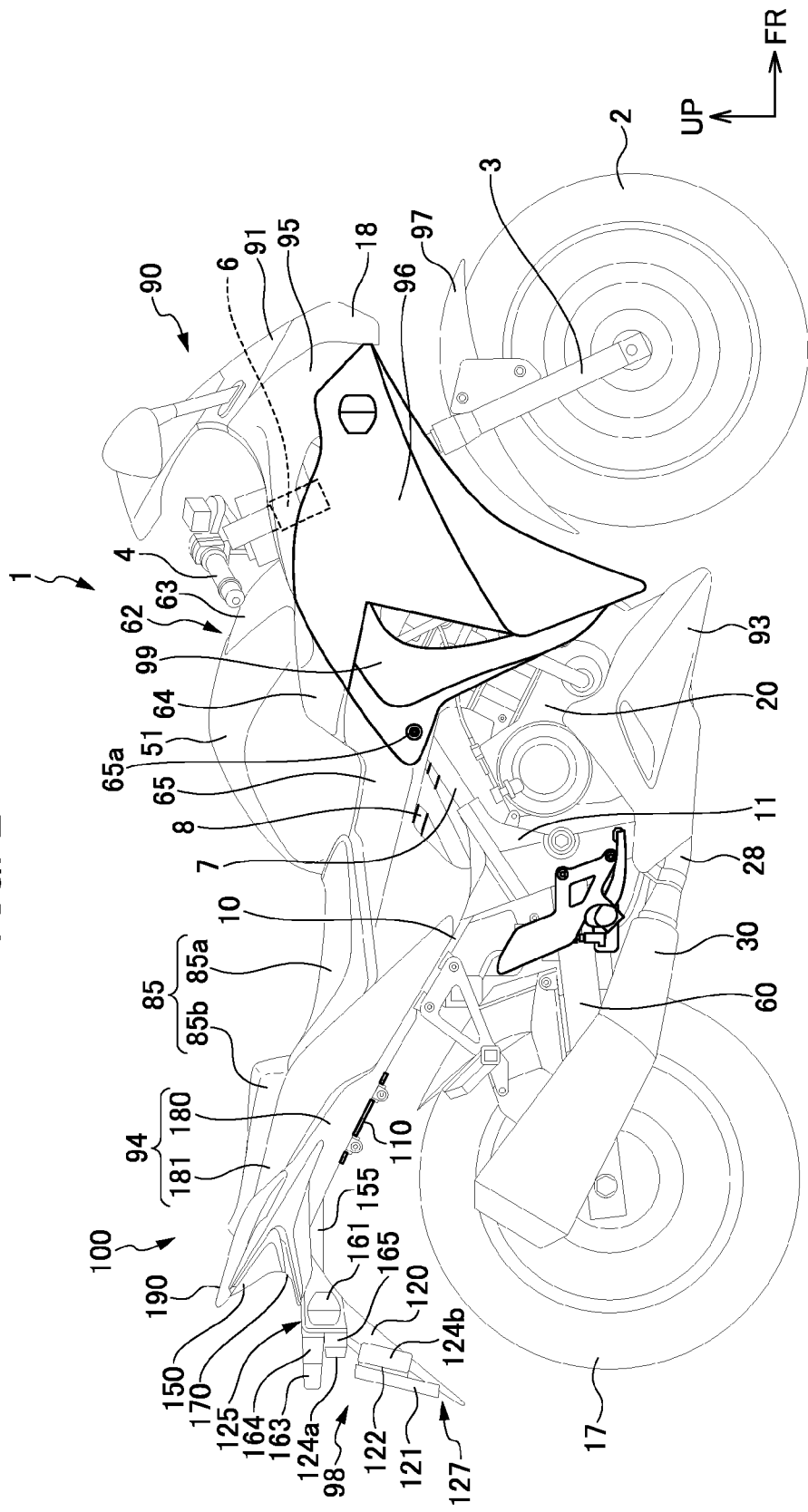
FIG. 2 is a right-side view showing a motorcycle of an embodiment of the present invention.

Hereinafter, an embodiment of the present invention will be explained while referencing the drawings. FIGS. 1 and 2 are right-side views showing a motorcycle of an embodiment of the present invention. In FIG. 1, a state in which a portion of cover members has been removed is shown. FIG. 2 shows a state in which all cover members are mounted to the chassis. It should be noted that descriptions of front-rear, left-right and upper-lower in the following explanation are in accordance with the directions viewed from rider (driver) riding on the motorcycle, unless particularly specified. In addition, the arrow FR in the drawings indicates ahead of the vehicle, the arrow LH indicates left of the vehicle, and the arrow UP indicates above the vehicle.

First, the overall configuration of a motorcycle 1 of the present embodiment will be explained while referencing FIG. 1. As shown in FIG. 1, the motorcycle 1 of the present embodiment is mainly configured with a chassis frame 5; a front wheel 2; front forks 3 pivotally supporting the front wheel 2; handlebars 4 joined to the front forks 3; an engine 20 that is supported from the chassis frame 5; a rear wheel 17 that is the drive wheel; a swing arm 60 that is mounted through a rear cushion (not illustrated) to the chassis frame 5 to freely swing up and down, and that pivotally supports the rear wheel 17; pivot plates 11 joining the swing arm 60 to the chassis frame 5 to freely swing up and down; a fuel tank 51; a seat 85 for rider seating; a head light 18; a tank cover 62 that covers part of the fuel tank 51; a body cover 90; a front fender 97; and a rear portion structure 100. The tank cover 62 includes a front tank cover 63 that covers a front part of the fuel tank 51, and front tank side covers 64 and side covers 65 that cover parts of the lateral sides of the fuel tank 51 in the vehicle width direction. The rear portion structure 100 is configured to include a rear fender 98 that is fixed to a rear portion of the chassis frame 5, and covers above the rear wheel 17 from the rear.

The chassis frame 5 is configured by a plurality of types of steel stock being integrally joined by welding or the like. As shown in FIG. 1, the chassis frame 5 includes a head pipe 6, main frames 7, seat rails 8, down tubes 9, rear stays 10, pivot plates 11, and a plurality of cross-members (not illustrated).

The head pipe 6 is disposed at a front-end of the chassis frame 5, and supports a pair of the front forks 3 pivotally supporting the front wheel 2. The main frames 7 are provided as a pair on the left and right. The pair of main frames 7 extends obliquely downwards to the rear from the head pipe 6 in a side view. Lower ends of the pair of main frames 7 are joined to the pivot plates 11.

The seat rails 8 are provided as a pair on the left and right. In a side view, the pair of seat rails 8 is joined at an end side thereof to the main frames 7. The other end side of the seat rails 8 extends obliquely upwards to the rear, forming a relatively steep incline. Details of the rear portion of the seat rail 8 will be described later.

The down tubes 9 are provided as a pair on the left and right. The pair of down tubes 9 extends obliquely downwards to the rear from the head pipe 6 in a side view. A mount plate (not illustrated) supporting the engine 20 is fixed to a lower portion of the down tubes 9. A cover-member fastening stay 146 that fastens a part of the body cover 90 extends forwards from the mount plate.

Rear stays 10 are provided as a pair on the left and right. The pair of rear stays 10 is joined at an end side thereof to a rear end of the pair of pivot plates 11. The other end side of the rear stay 10 extends obliquely upwards to the rear, forming a relatively steep incline, and is joined to a rear portion of the pair of seat rails 8. Details of the rear portion of the rear stays 10 will be described later.

The cross-members (not illustrated) are constituted of pipe members extending in the left-right direction, and join pair of frames on the left and right (main frames 7, down tubes 9, seat rails 8, etc.) in the left-right direction.

The front forks 3 are provided as a pair on the left and right. The upper ends of the pair of front forks 3 are joined to the lower end of the handlebars 4. The upper ends of the pair of front forks 3 are supported by a steering stem (not illustrated) that is pivotally supported to be freely rotatable to the head pipe 6, and a bridge (not illustrated) that is fixed to the lower and upper ends of the steering stem. The lower ends of the pair of front forks 3 pivotally support the front wheel 2 to be rotatable.

The head light 18 is disposed in front of the head pipe 6 and above the front fender 97, and illuminates in front of the chassis. The head light 18 is fixed to a head-light support stay (not illustrated), which is fixed to the chassis frame 5.

The engine 20 is the motor of the motorcycle 1 (e.g., four-cycle single cylinder water-cooled engine), and is installed at substantially a central part of the chassis frame 5 in the front-rear direction, as shown in FIG. 1. The engine 20 is arranged so as to have the crankshaft (not illustrated) follow the left-right direction of the chassis. An exhaust pipe 28 to discharge exhaust gas is connected to the engine 20. A muffler 30 for silencing the exhaust note is connected to the tail end of the exhaust pipe 28.

The fuel tank 51 stores fuel supplying the engine 20. The fuel tank 51 is disposed behind the head pipe 6 and in front of the seat 85, and is disposed at an upper portion of the chassis frame 5 (main frames 7 and seat frames 8).

The seat 85 for rider seating consists of a main seat 85a on which a driver sits, and a pillion seat 85b on which a rear passenger sits. The seat 85 for rider seating is supported at an upper portion of the pair of seat rails 8.

Next, the body cover 90 will be explained while referencing FIGS. 1 and 2. The body cover 90 covers the chassis frame 5. The body cover 90 includes a front-center upper cover 91, front-upper side covers 95, an inner cowl 92, first front-side cowls 96, second front-side cowls 99, an under cowl 93, and a rear cowl 94.

As shown in FIGS. 1 and 2, the front-center upper cover 91 is disposed above the head light 18 and ahead of the head pipe 6, and is fastened to the front-upper side covers 95 (described later).

The front-upper side covers 95 are provided as a pair on the left and right, and are disposed on lateral portions of the head light 18, as shown in FIGS. 1 and 2. More specifically, the front-upper side covers 95 are disposed between the head light 18 and the fuel tank 51 in a side view, and cover the head pipe 6 from the side. The front-upper side covers 95 are formed in a substantially triangular shape that narrows from the front towards the rear in a side view. The front-upper side covers 95 are fastened at front portions thereof to the head light 18 or head-light support stays (not illustrated), and are locked at lower ends thereof to the first front-side cowl 96.

The first front-side cowls 96 are provided as a pair on the left and right, and are disposed at a lower portion of the front-upper side cowls 95, as shown in FIG. 2. The first front-side cowls 96 are disposed so as to cover lateral sides of the chassis frame 5 and the engine 20. The first front-side cowls 96 are formed in a substantially triangular shape that narrows from the rear towards the front in a side view, and are made in a shape having a portion at a rear end cut out in a substantially triangular shape.

As shown in FIG. 2, the first front-side cowls 96 are locked at upper portions thereof to lower portions of the front-upper side covers 95, and are fastened at lower portions thereof to the chassis frame 5 through cover-member fastening stays 146 (refer to FIG. 1). Rear portions of the first front-side cowls 96 are fastened to the second front-side cowls 99.

In addition, locking projections (not illustrated) are provided to upper portions of the first front-side cowls 96 on an inner face at a rear end side. By inserting the locking projection through a resin clip (not illustrated) into a locking portion 64a (refer to FIG. 1) provided at a rear-lower end side of the front tank side cover 64 (described later), the first front-side cowl 96 is locked to the front tank side cover 64.

The second front-side cowls 99 are provided as a pair on the left and right, joined to the rear of first front-side cowls 96, and disposed so as to cover lateral sides of the chassis frame 5 and engine 20, as shown in FIG. 2. The second front-side cowls 99 are formed in a substantially L shape in a side view. The second front-side cowls 99 are joined at one end thereof to cut-out lower edges of the upper portions of the first front-side cowls 96, and are joined at the other end thereof to lower portions of the first front-side cowls 96.

More specifically, the second front-side cowls 99 are joined to the first front-side cowls 96 by making a cowl matching surface thereof (not illustrated) and a cowl matching surface (not illustrated) of the first front-side cowl 96 overlap, and fastening the overlapping portion with fastening members (not illustrated). The second front-side cowls 99 integrated with the first front-side cowls 96 are tightened and fixed along with side covers 65 at fastening portions 65a (refer to FIGS. 1 and 2) located substantially in a central part of the main frames 7 in the front-rear direction.

The inner cowl 92 is disposed at inner sides in the vehicle width direction of the first front-side cowls 96, and is fixed to the first front-side cowls 96. An upper portion of the inner cowl 92 is locked to lower portions of the front-upper side covers 95. A lower portion of the inner cowl 92 is fastened to cover-member fastening stays 146 (refer to FIG. 1).

The under cowl 93 covers the exhaust pipe 28 located below the engine 20 from both sides of the chassis. The under cowl 93 is formed in a substantially triangular shape widening from the front to towards the rear in a side view. An upper portion of the under cowl 93 on a front side is fastened to the cover-member fastening stays 146 (refer to FIG. 1). A rear portion of the under cowl 93 is fastened to a rear portion of the chassis frame 5.

Details of the rear cowl 94 will be described later.

The front fender 97 is fixed to the front forks 3, and covers above the front wheel 2. The rear fender 98 is fixed to the seat rails 8, and covers above the rear wheel 17 from behind. Details of the rear fender 98 will be described later.

Figure 3:
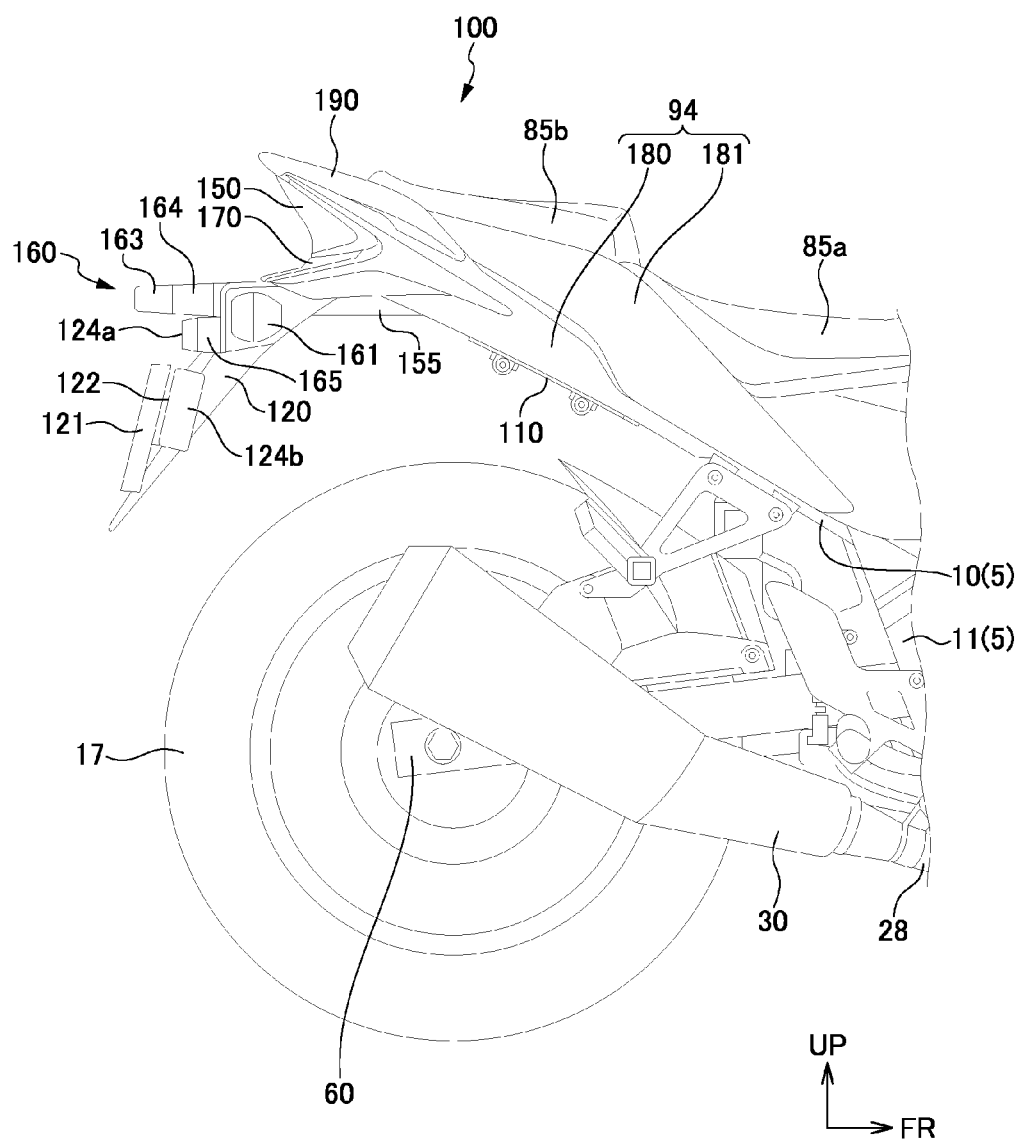
FIG. 3 is a right-side view showing a rear portion structure of the motorcycle.
Figure 4:
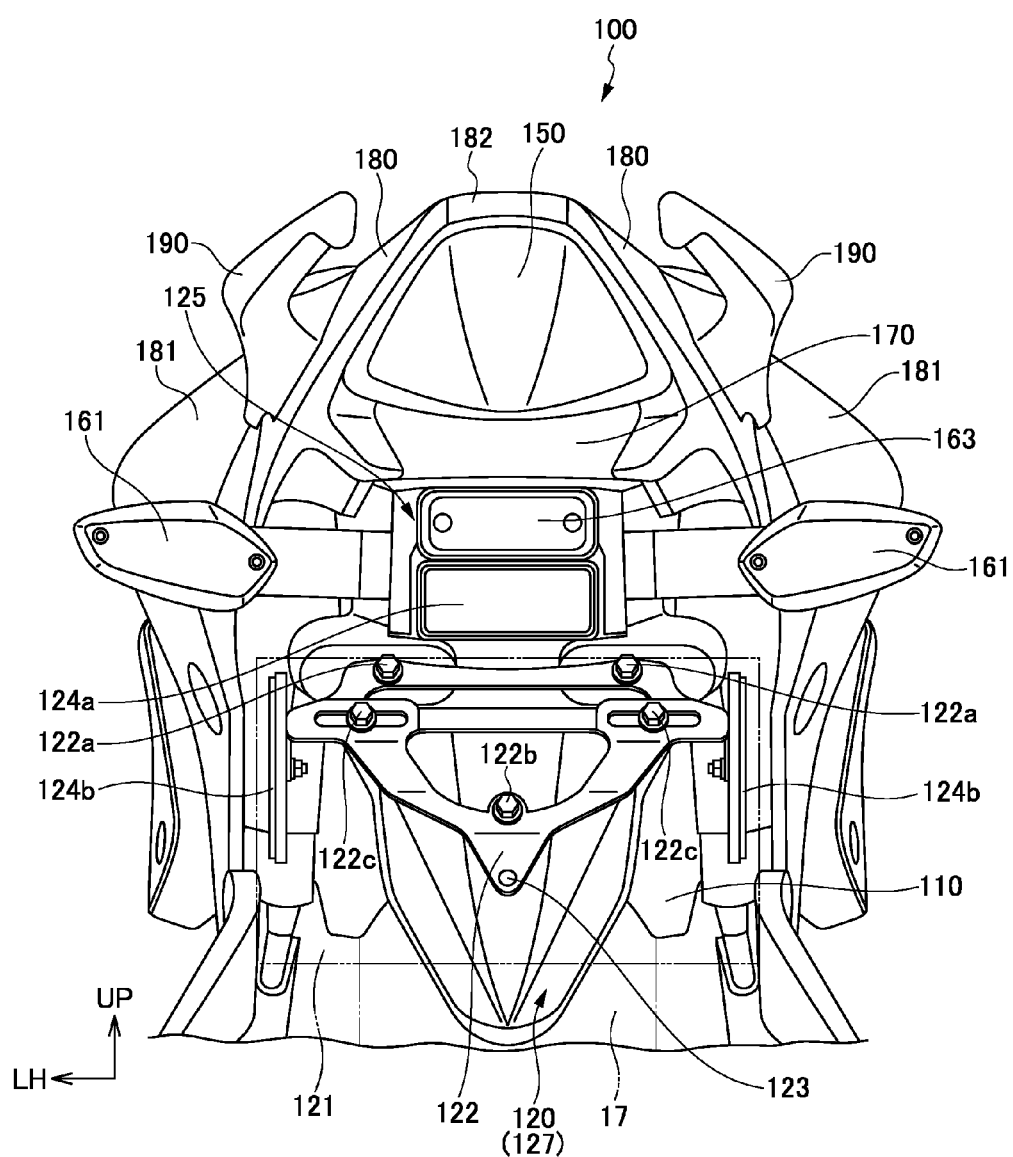
FIG. 4 is a rear view showing a rear portion structure of the motorcycle.
Figure 5:
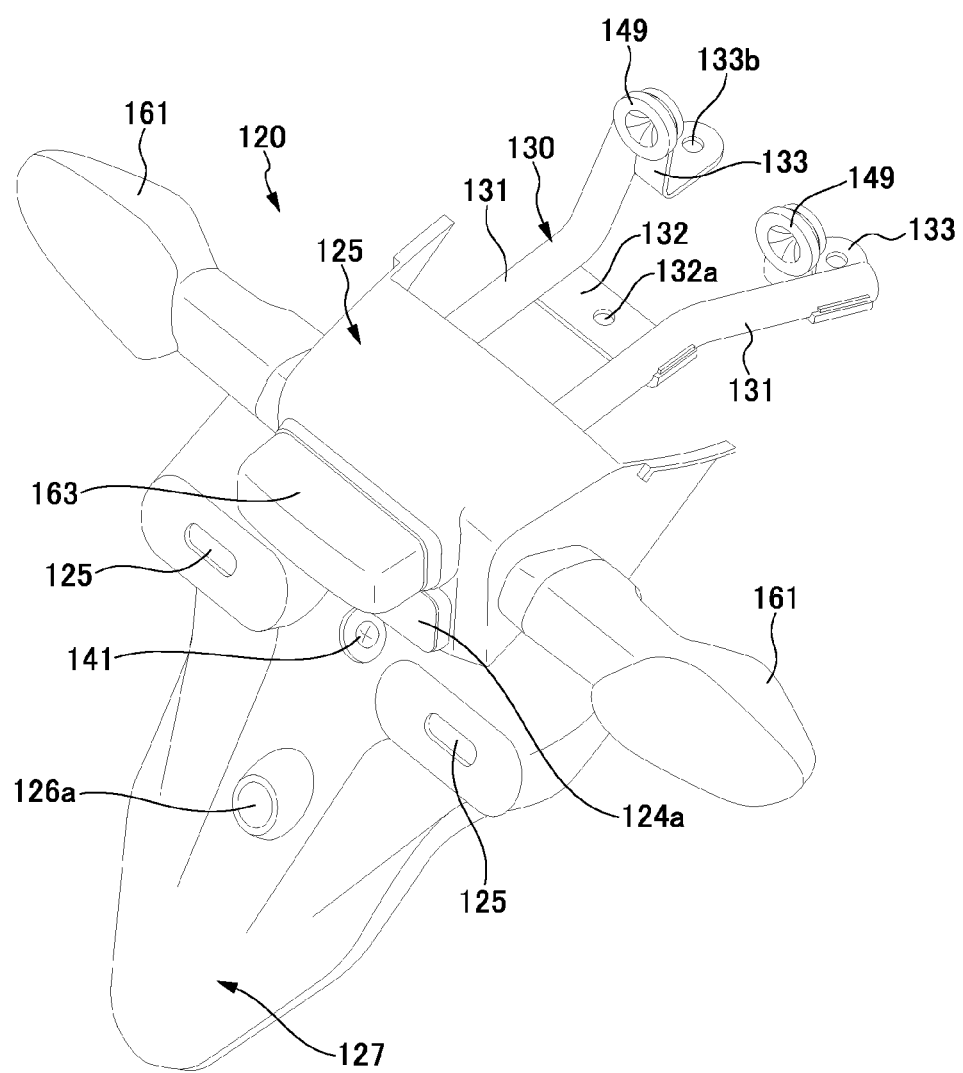
FIG. 5 is a perspective view showing a sub-assembled state of a fender hanging portion and the like to a support stay.
Figure 6:
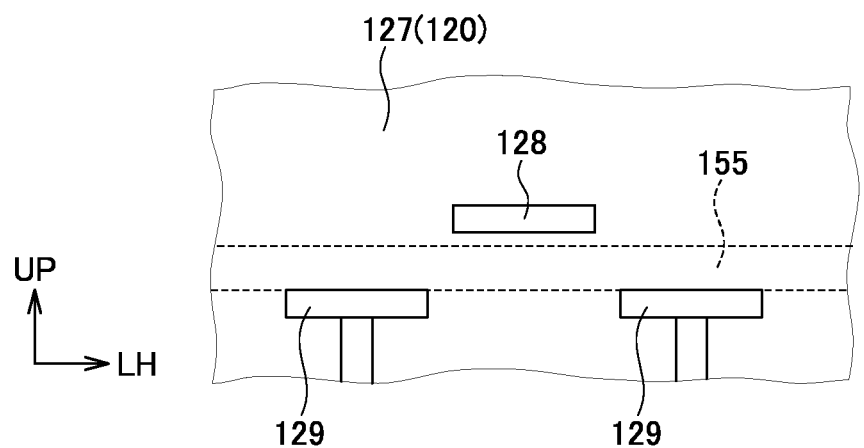
FIG. 6 is a front view showing an upper rib part and lower rib parts of the fender hanging portion.
Figure 7:
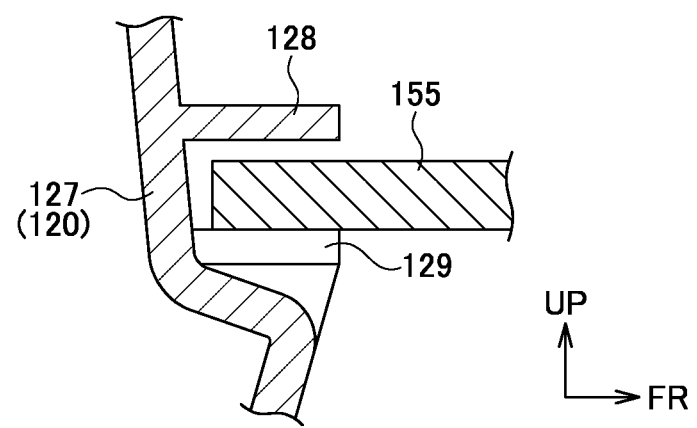
FIG. 7 is a cross-sectional view showing a vertical cross section of the upper rib part of the fender hanging portion.
Figure 8:
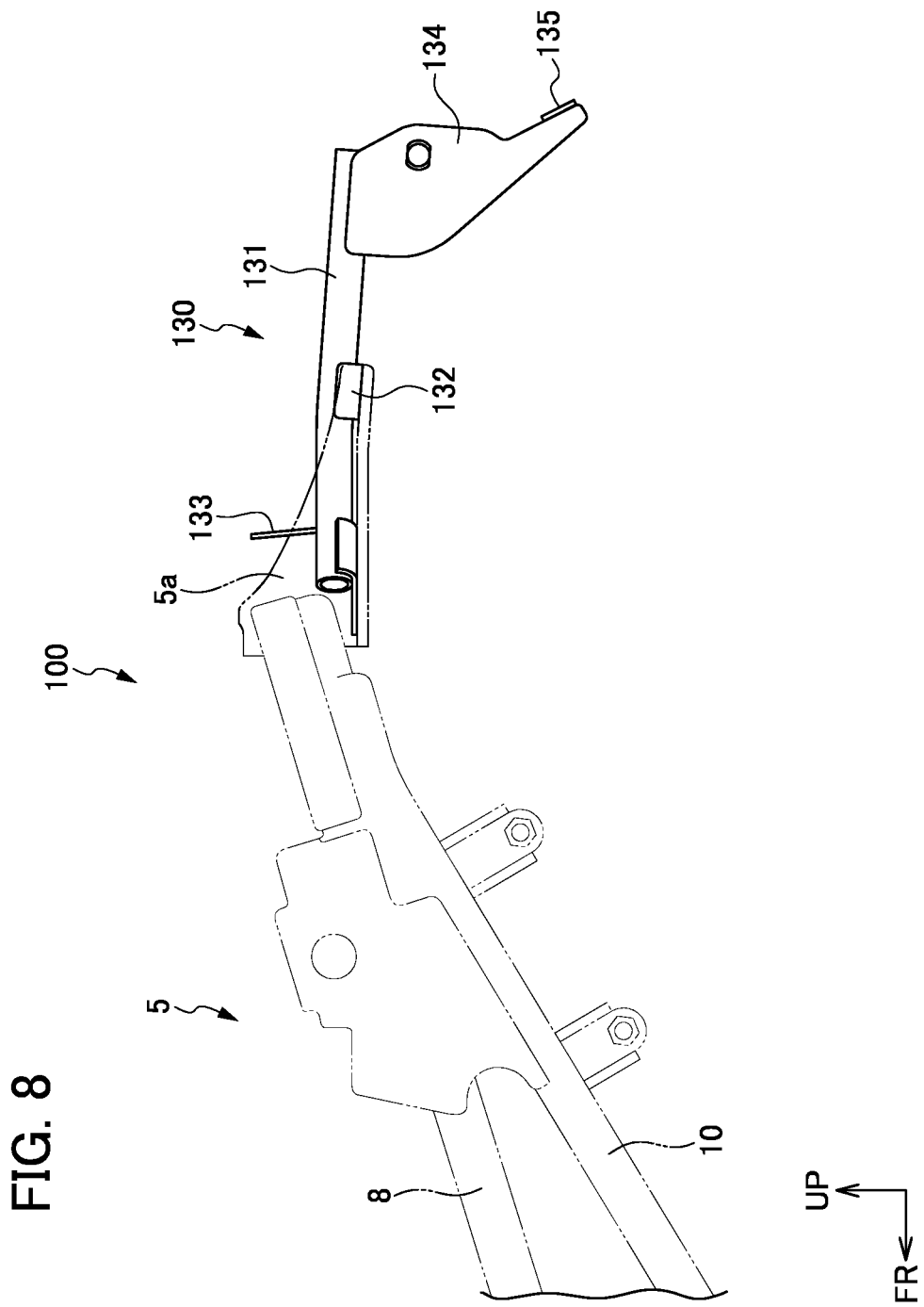
FIG. 8 is a left-side view showing a support stay mounted to a rear portion of a chassis frame.
Figure 9:
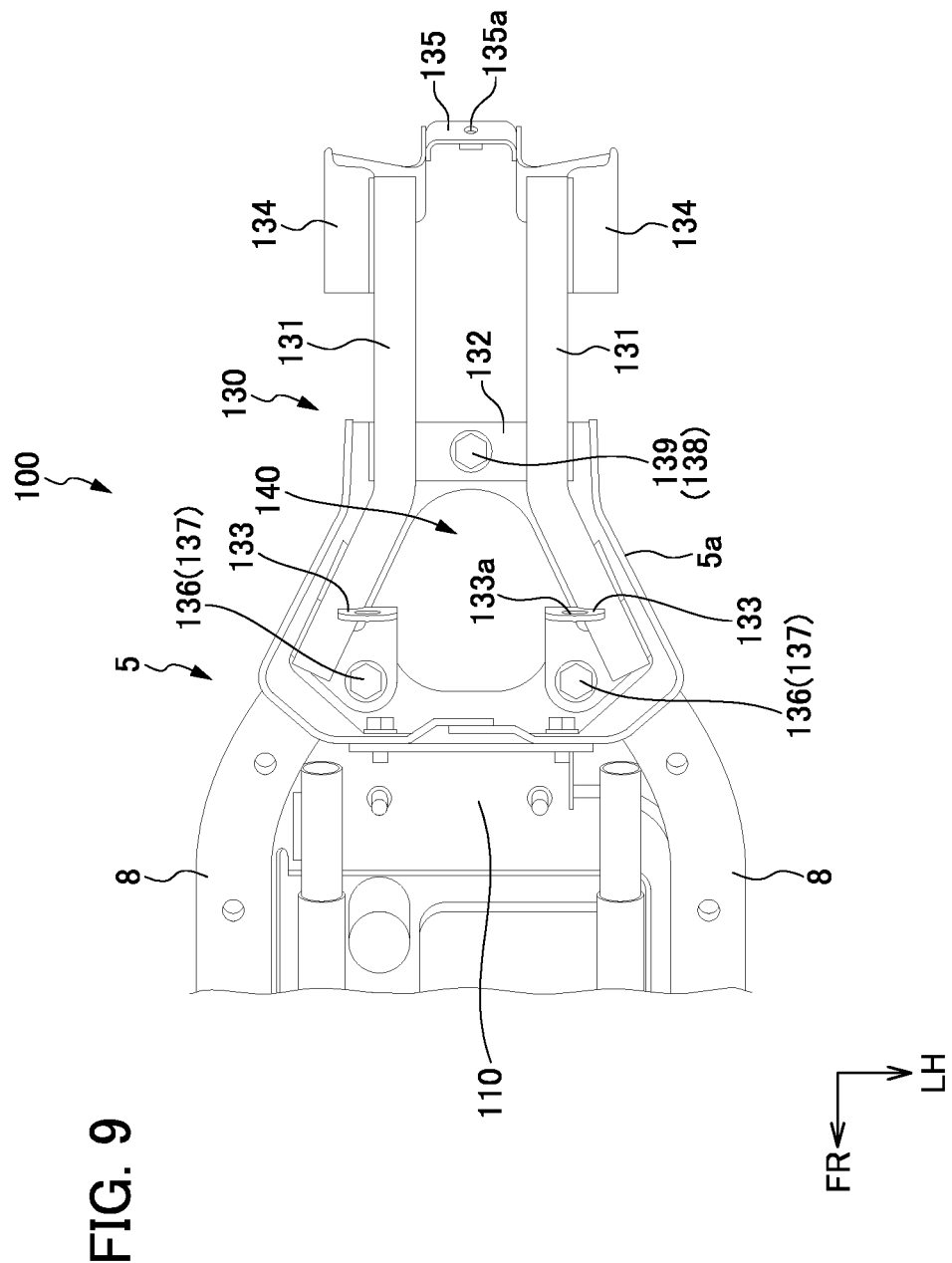
FIG. 9 is a plan view showing a support stay mounted to the rear portion of the chassis frame.
Figure 10:
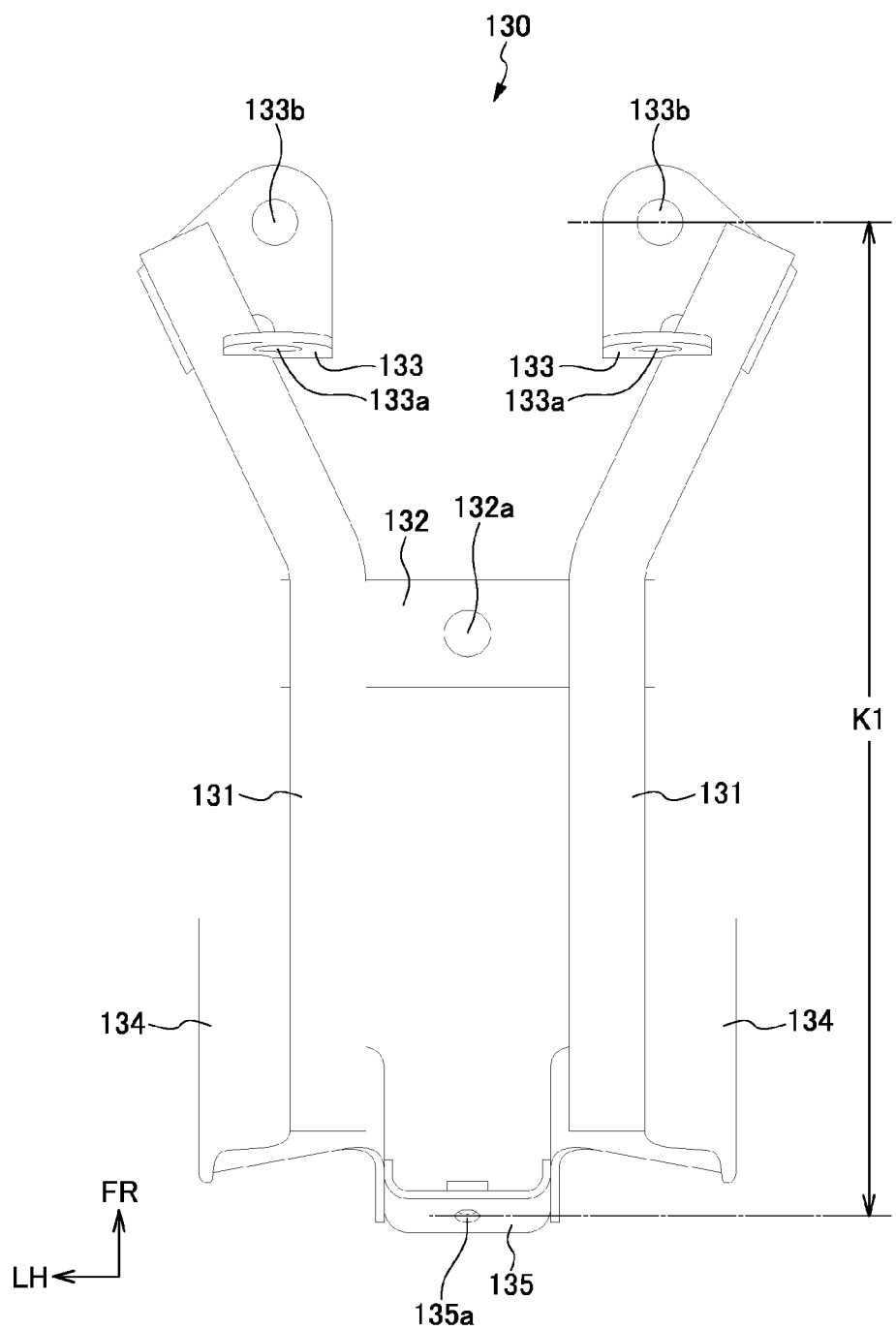
FIG. 10 is a plan view showing the support stay.
Figure 11:
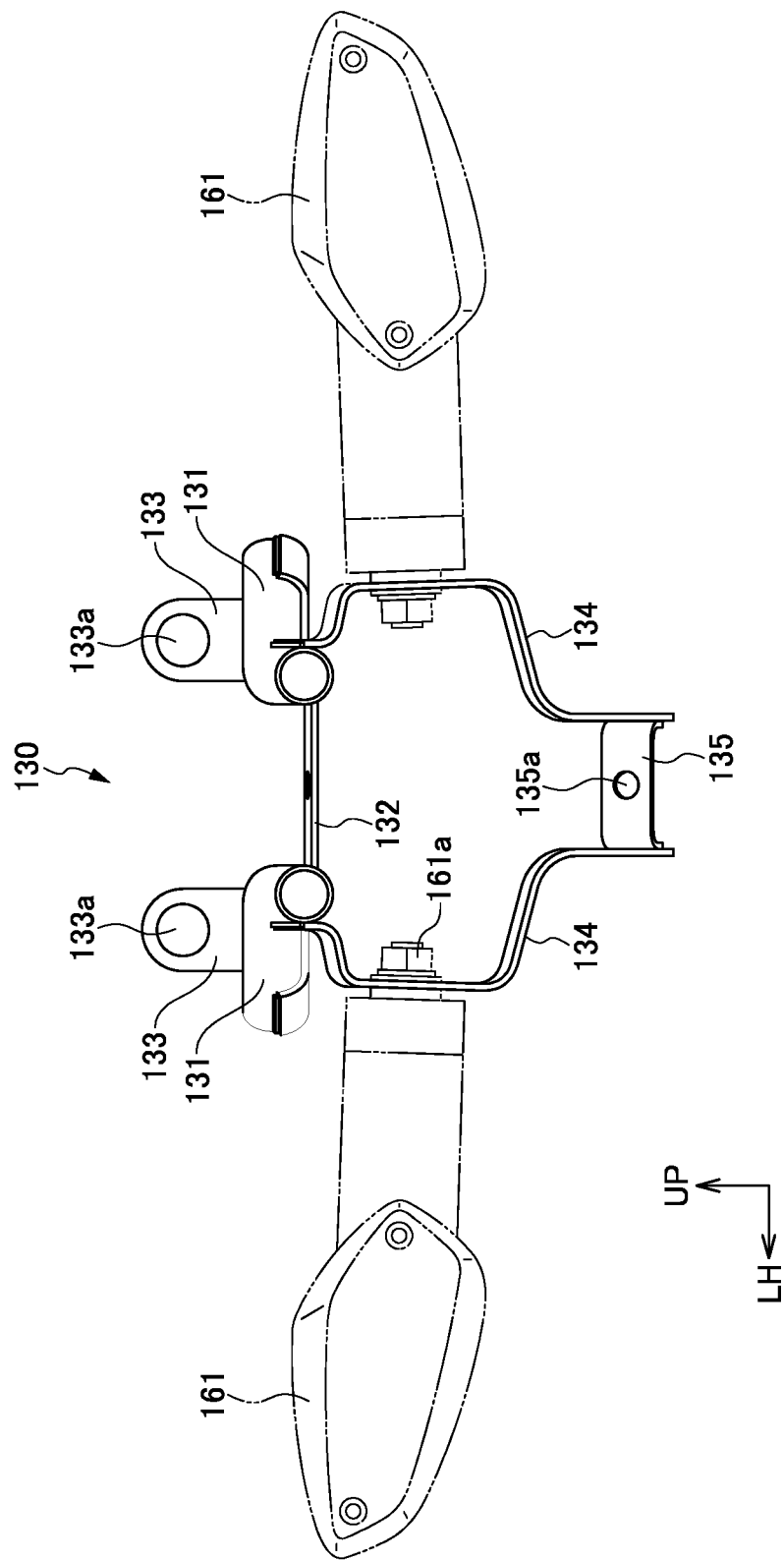
FIG. 11 is a rear view showing the support stay.

Next, the rear portion structure 100, which serves as the rear portion structure of the motorcycle 1 and is a characteristic portion of the present embodiment, will be specifically explained while referencing FIGS. 3 to 21. FIG. 3 is a right-side view showing the rear portion structure of the motorcycle. FIG. 4 is a rear view showing the rear portion structure of the motorcycle. FIG. 5 is a perspective view showing a sub-assembled state of a fender hanging portion to a support stay;

FIG. 6 is a side view showing an upper rib part and lower rib parts of the fender hanging portion. FIG. 7 is a cross-sectional view showing a vertical cross section of the upper rib part of the fender hanging portion. FIG. 8 is a left-side view showing a support stay mounted to the rear portion of the chassis frame. FIG. 9 is a plan view showing the support stay mounted to the rear portion of the chassis frame. FIG. 10 is a plan view showing the support stay. FIG. 11 is a rear view showing the support stay.

Figure 12:
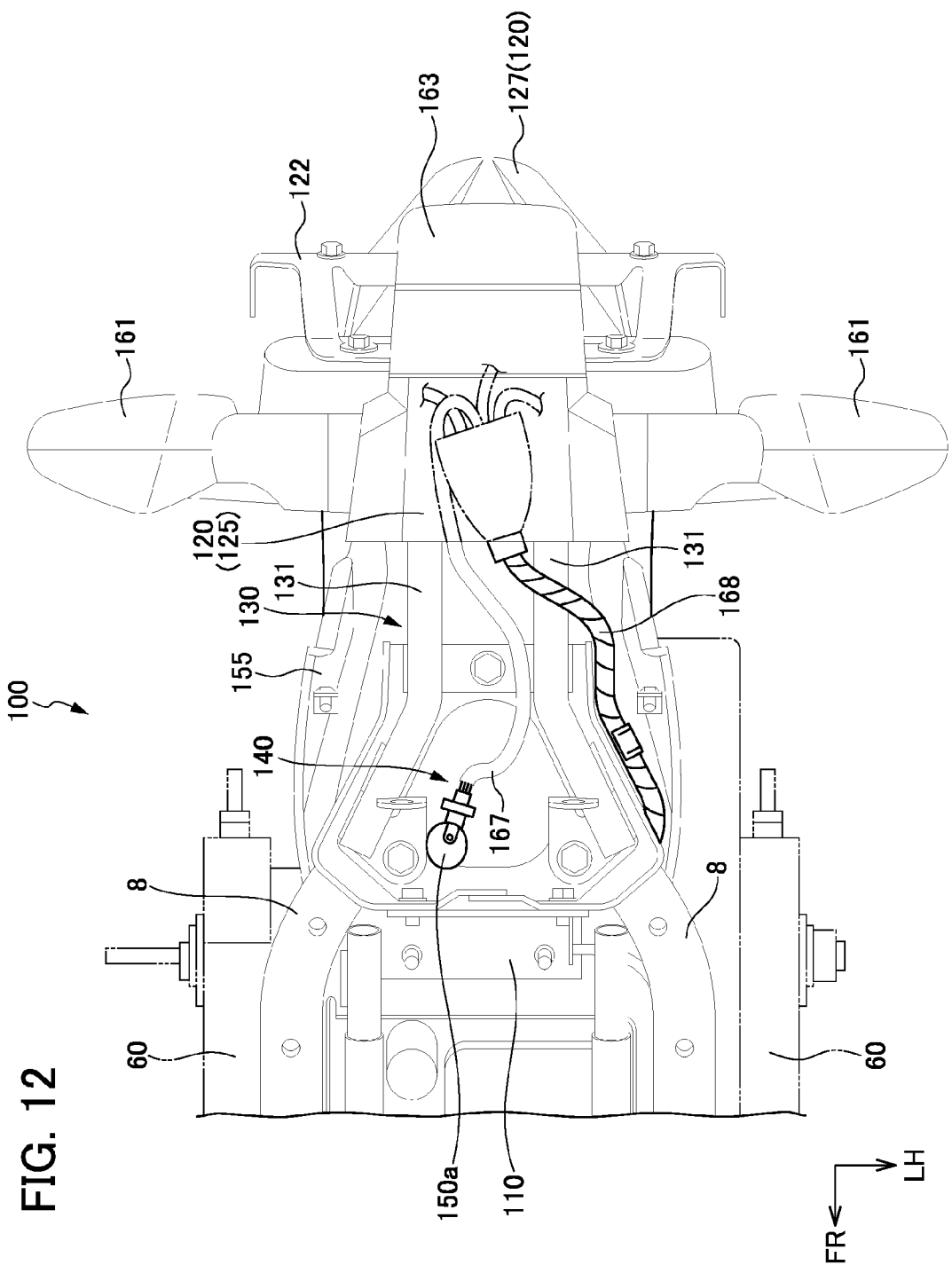
FIG. 12 is a plan view showing a state in which the subassembly of the support stay with fender hanging portion and the like is assembled to the chassis frame.
Figure 13:
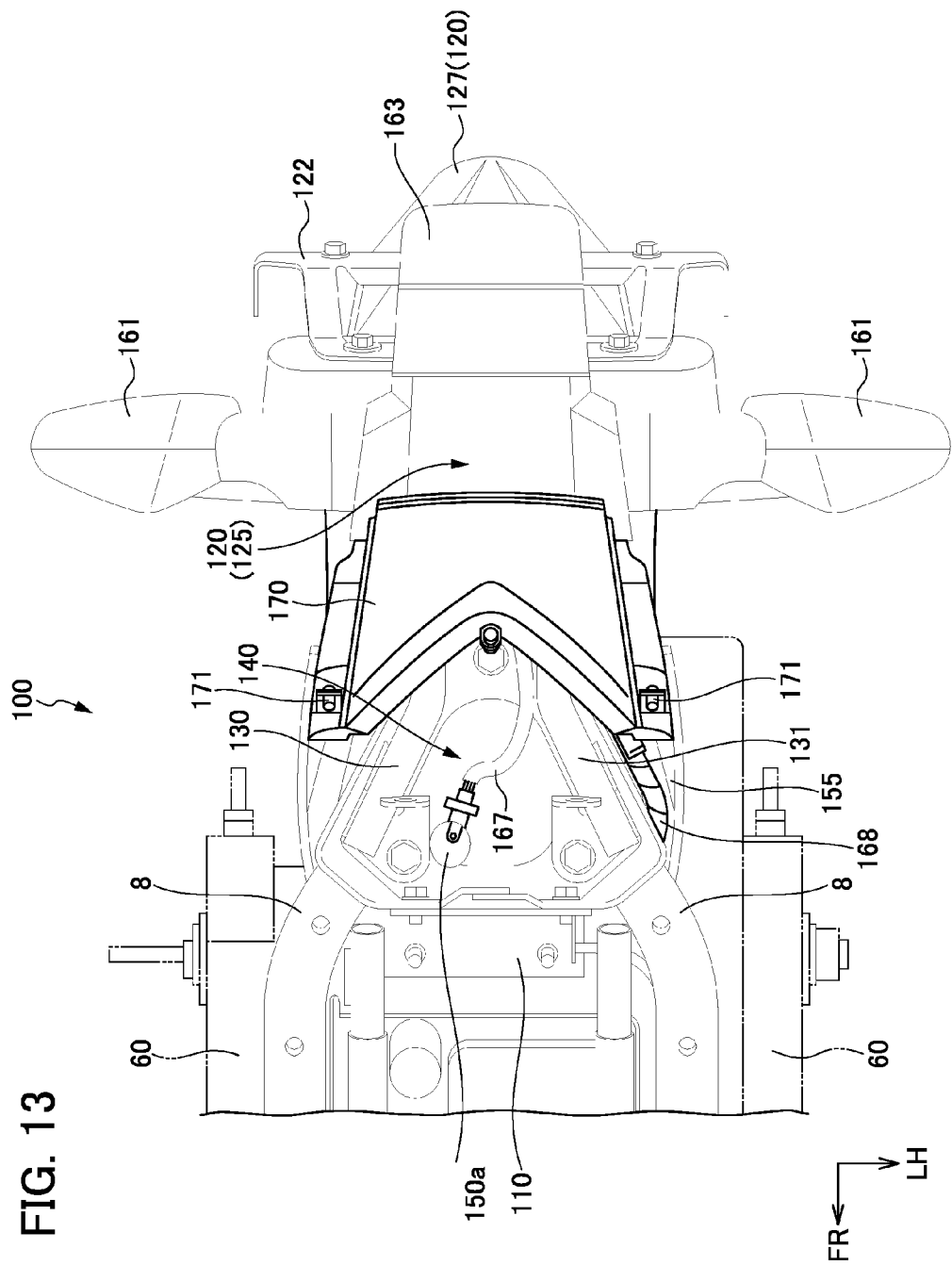
FIG. 13 is a plan view showing a state in which a rear-center cover is mounted to the rear portion structure shown in FIG. 12.
Figure 14:
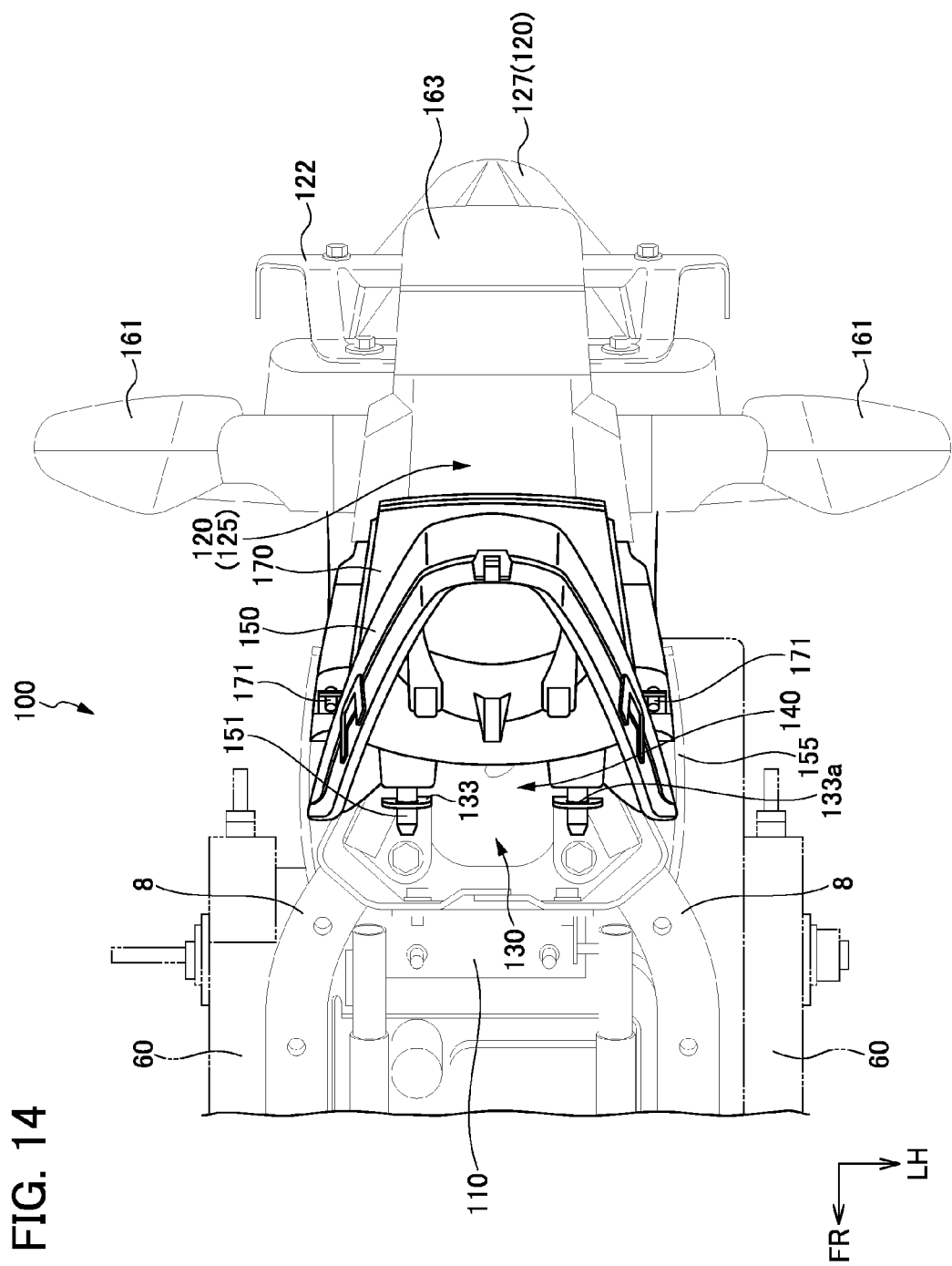
FIG. 14 is a plan view showing a state in which a tail light is mounted to the rear portion structure shown in FIG. 13.

FIG. 12 is a plan view showing a state in which the subassembly of the support stay with fender hanging portion and the like is assembled to the chassis frame. FIG. 13 is a plan view showing a state in which a rear-center cover is mounted to the rear portion structure shown in FIG. 12. FIG. 14 is a plan view showing a state in which a tail light is mounted to the rear portion structure shown in FIG. 13.

Figure 15:
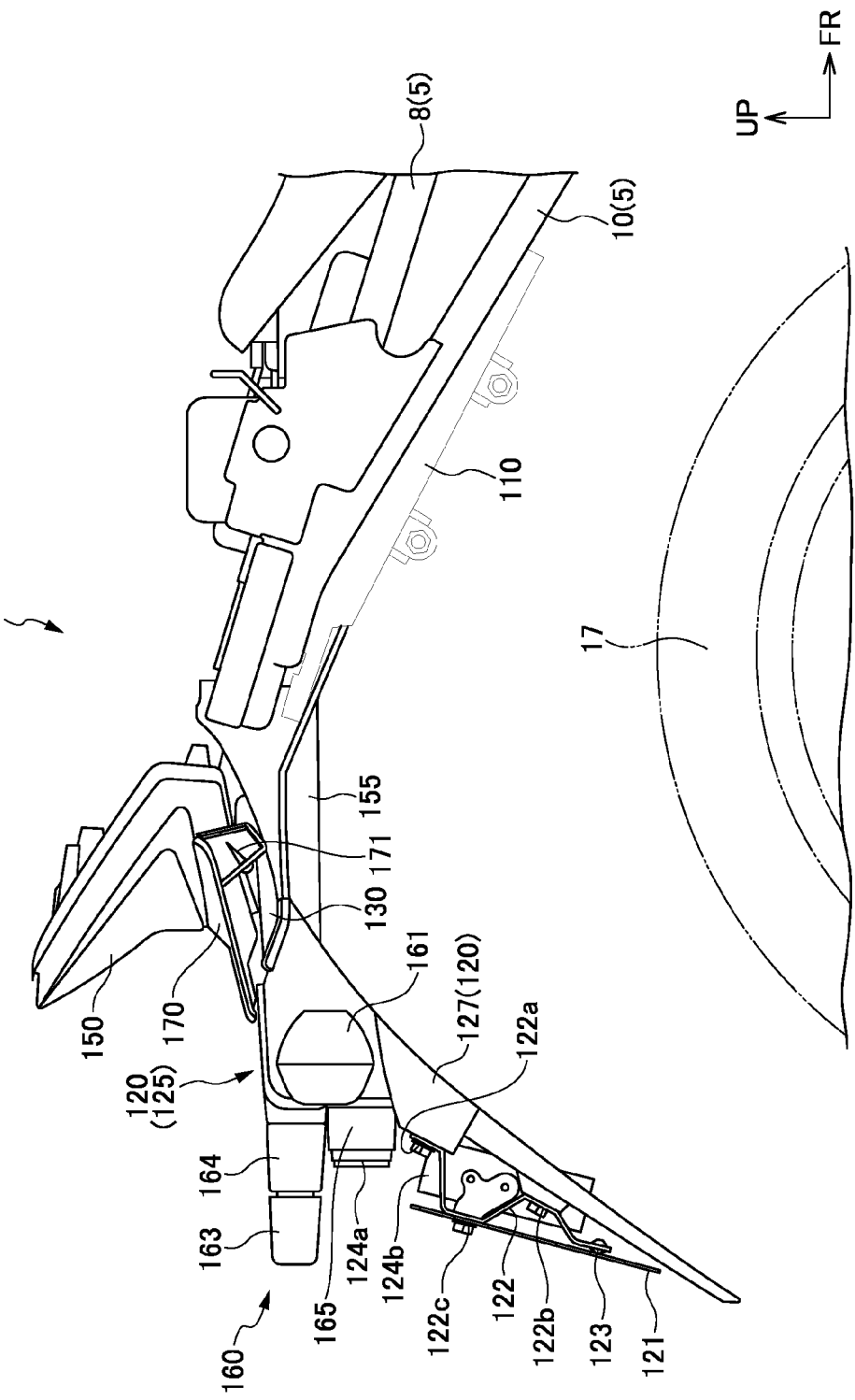
FIG. 15 is a right-side view of the rear portion structure shown in FIG. 14.
Figure 16:
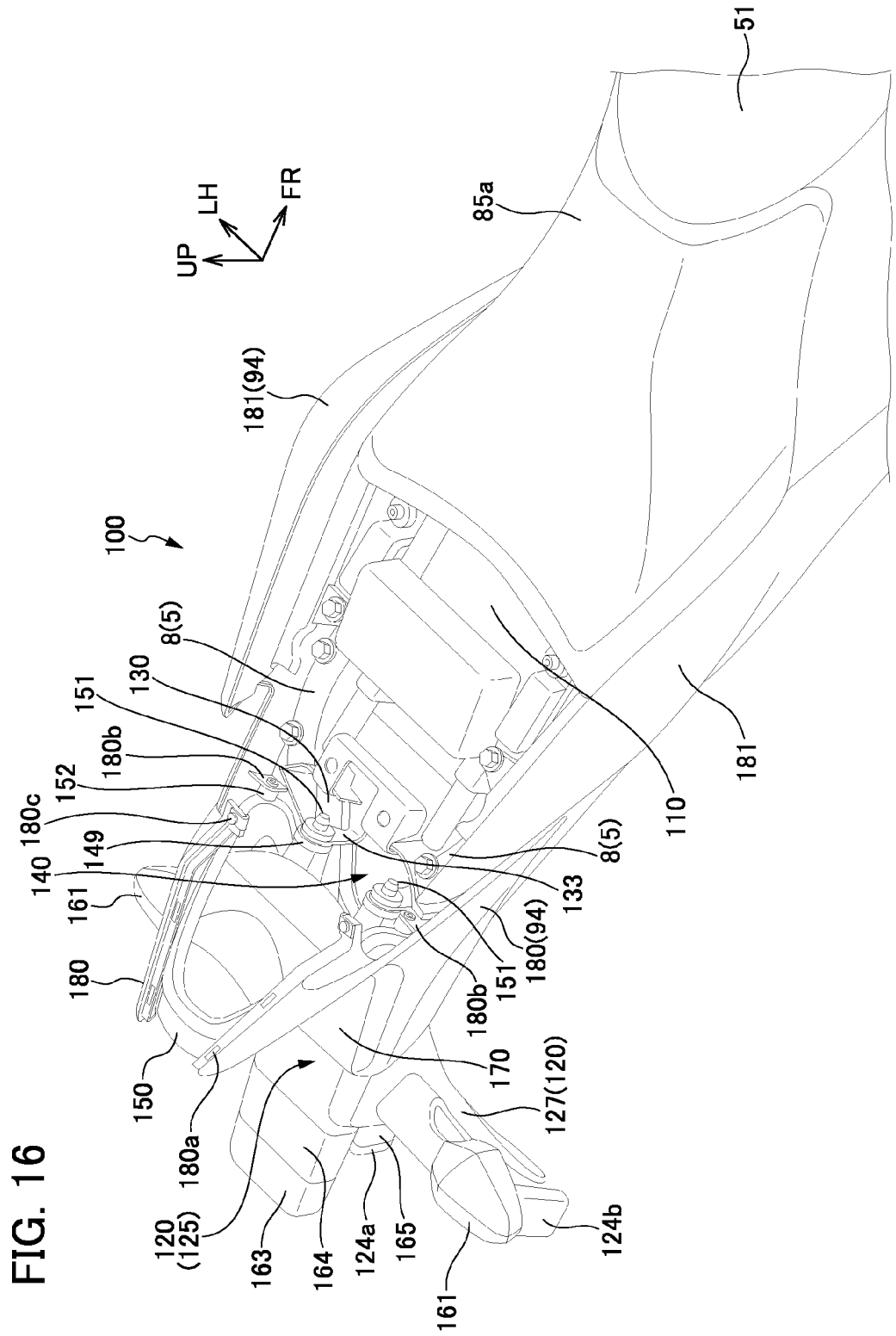
FIG. 16 is a perspective view showing a state in which a first rear cowl and a second rear cowl are mounted to the rear portion structure shown in FIG. 15.
Figure 17:
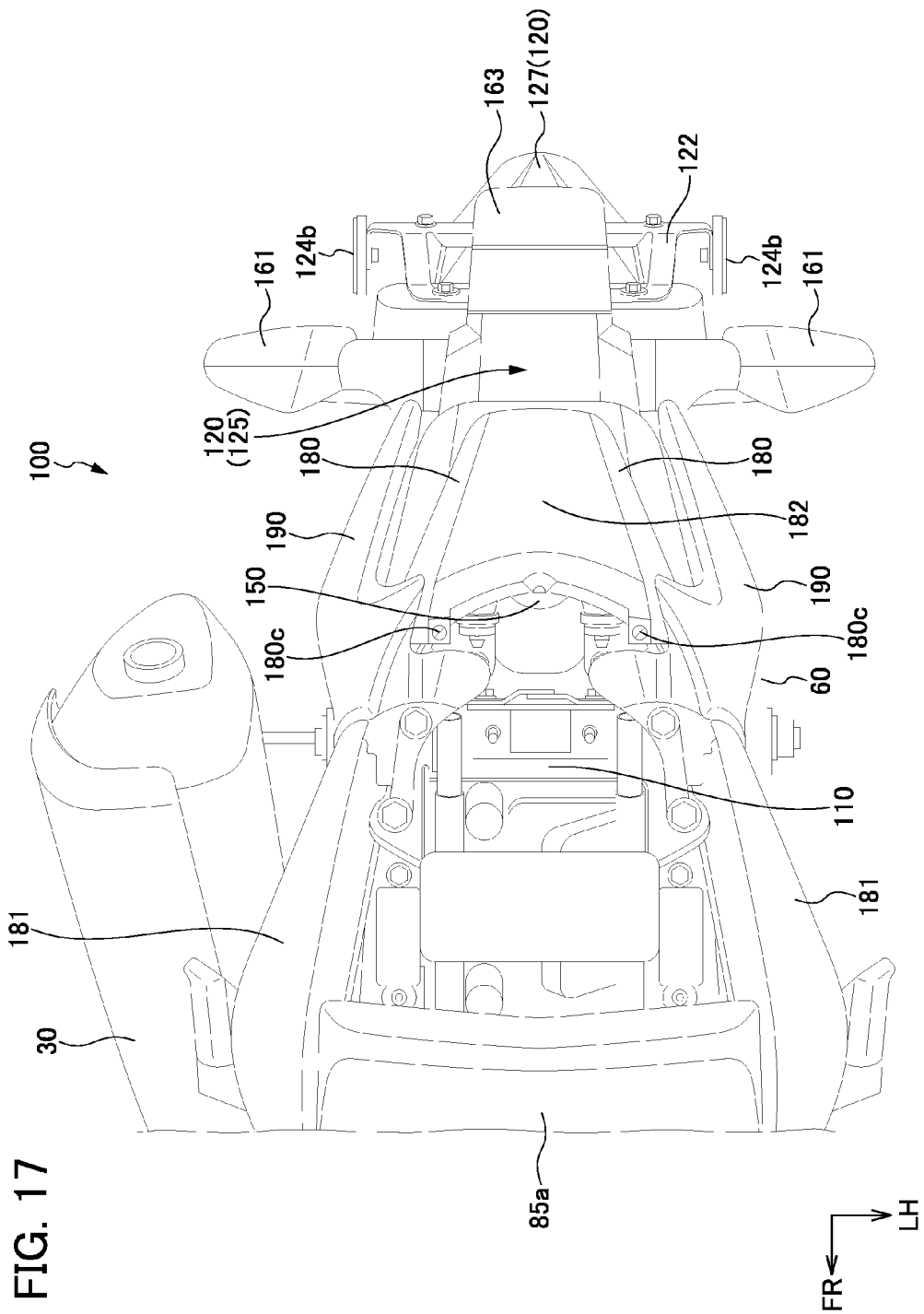
FIG. 17 is a plan view showing a state in which a rear-upper-center cowl and grips are mounted to the rear portion structure shown in FIG. 16.

FIG. 15 is a right-side view of the rear portion structure shown in FIG. 14. FIG. 16 is a perspective view showing a state in which a first rear cowl and a second rear cowl are mounted to the rear portion structure shown in FIG. 15. FIG. 17 is a plan view showing a state in which a rear-upper-center cowl and grips are mounted to the rear portion structure shown in FIG. 16.

Figure 18:
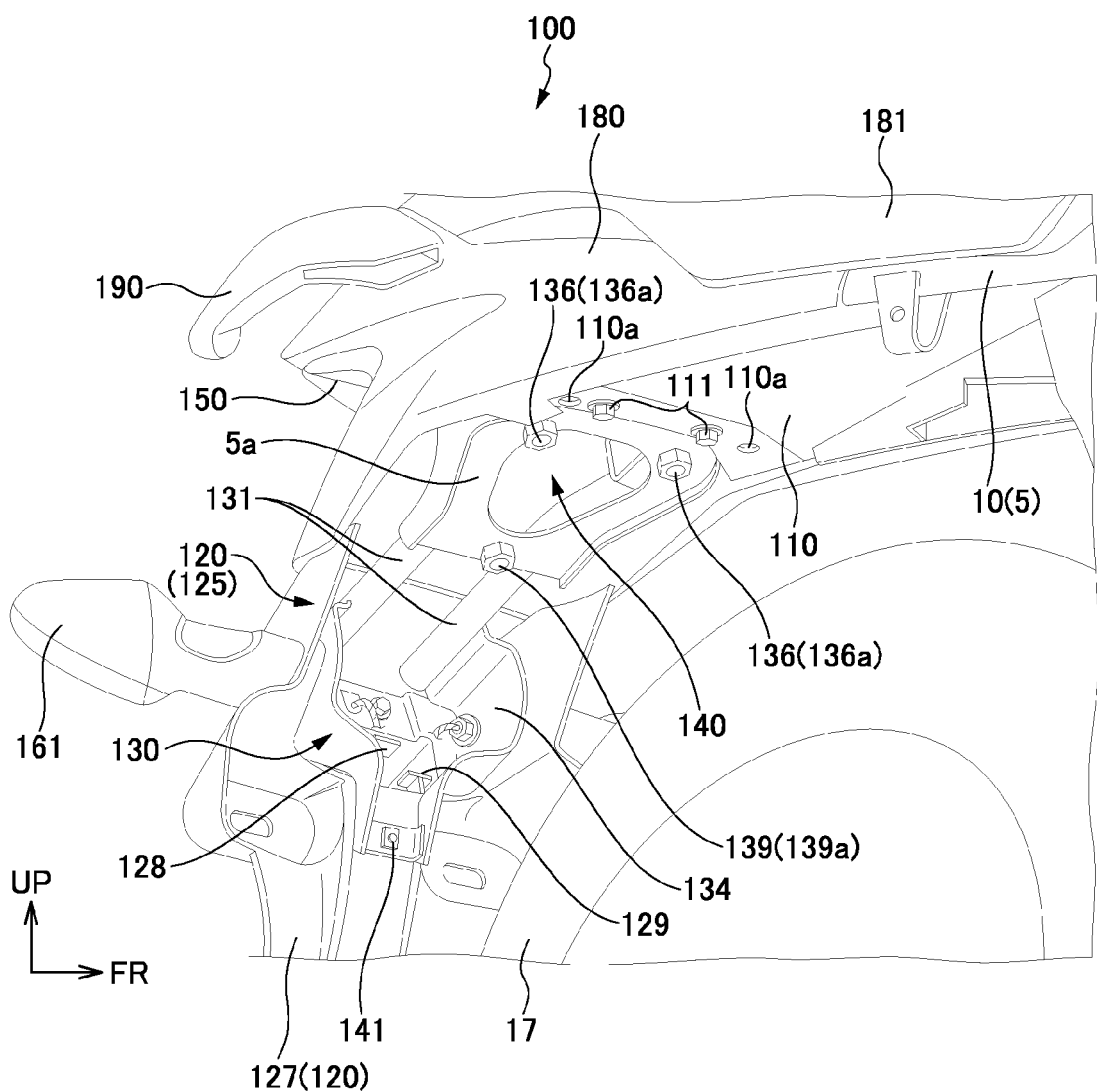
FIG. 18 is a perspective view showing the rear portion structure with an under cover removed.
Figure 19:
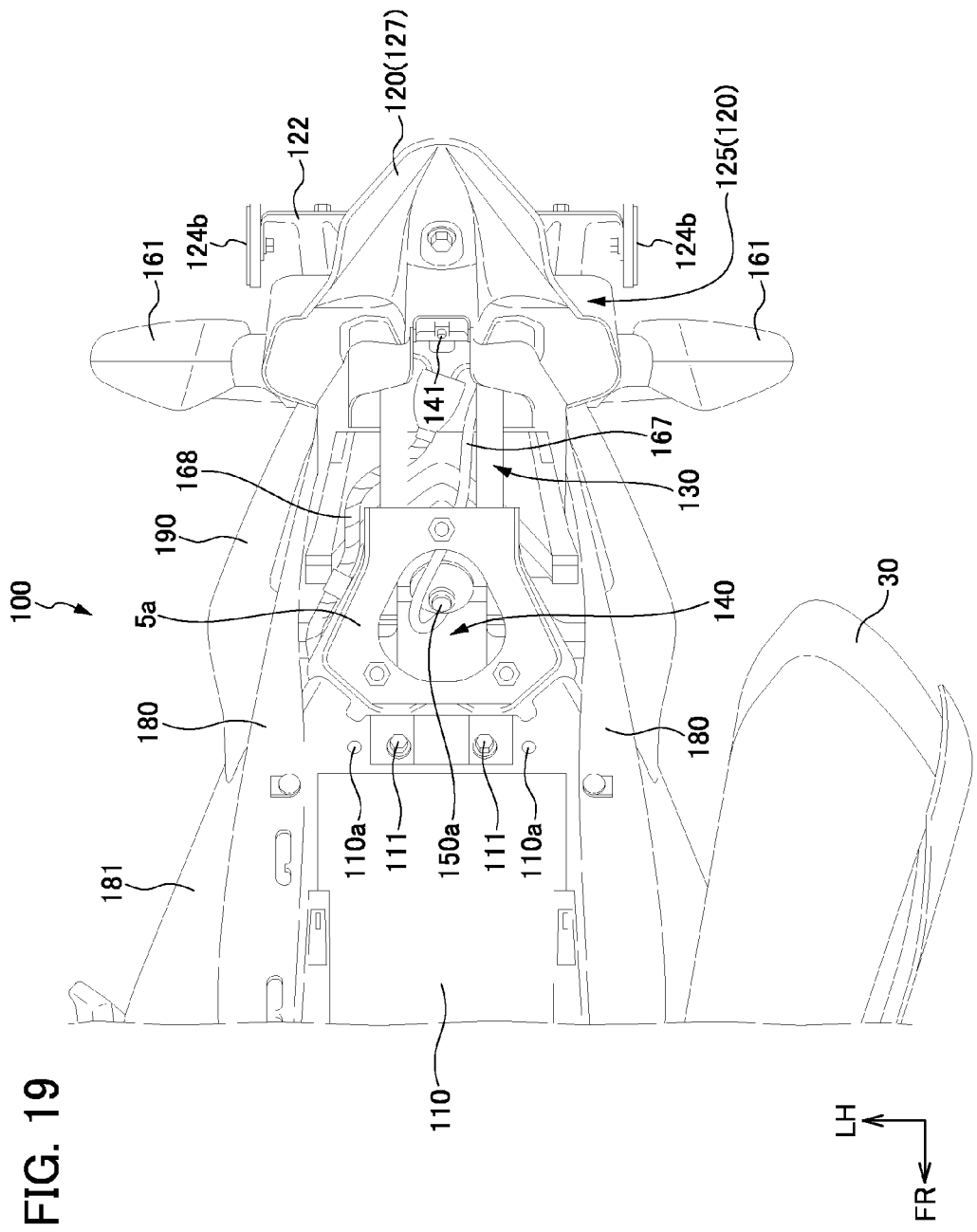
FIG. 19 is a bottom view showing the rear portion structure with the under cover removed.
Figure 20:
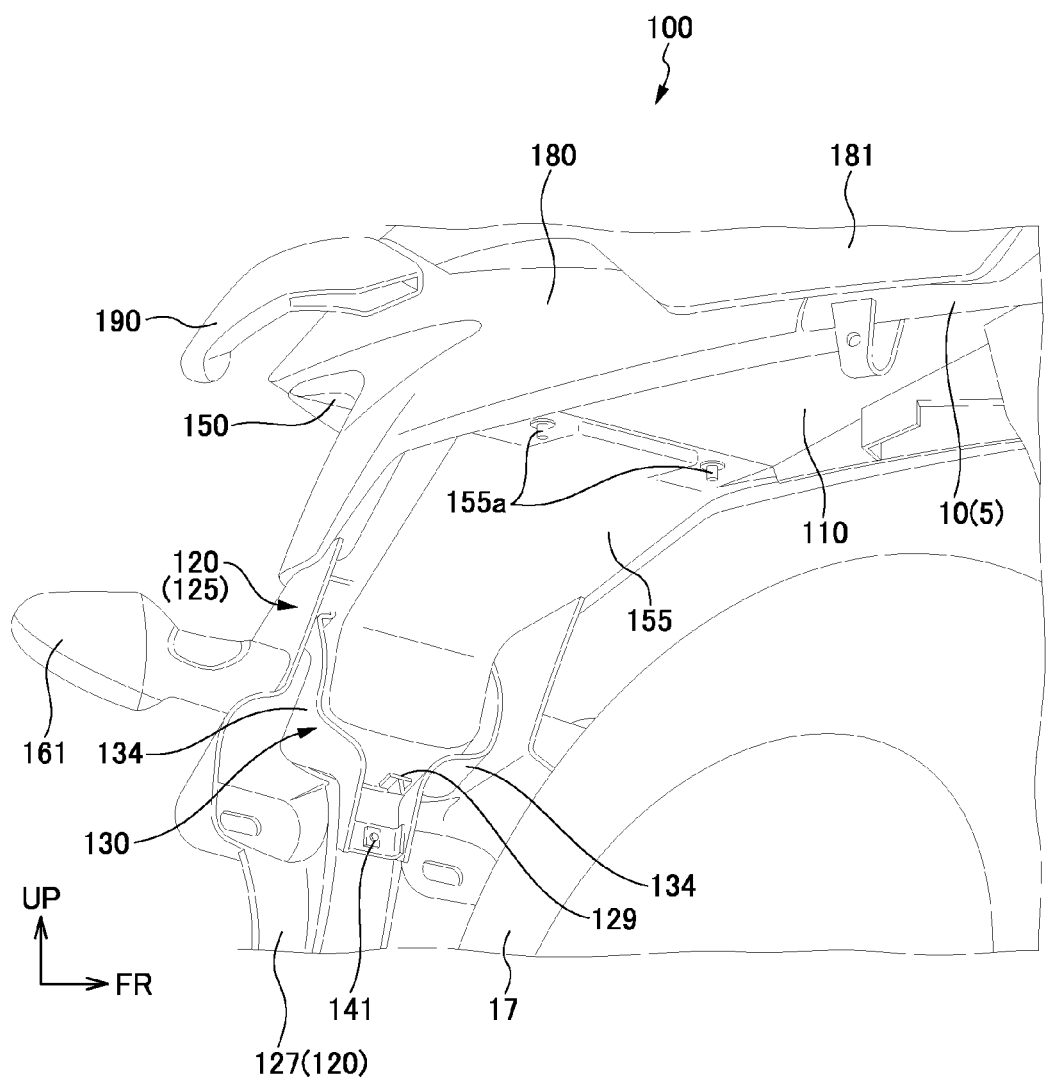
FIG. 20 is a perspective view showing the rear portion structure with the under cover mounted.
Figure 21:
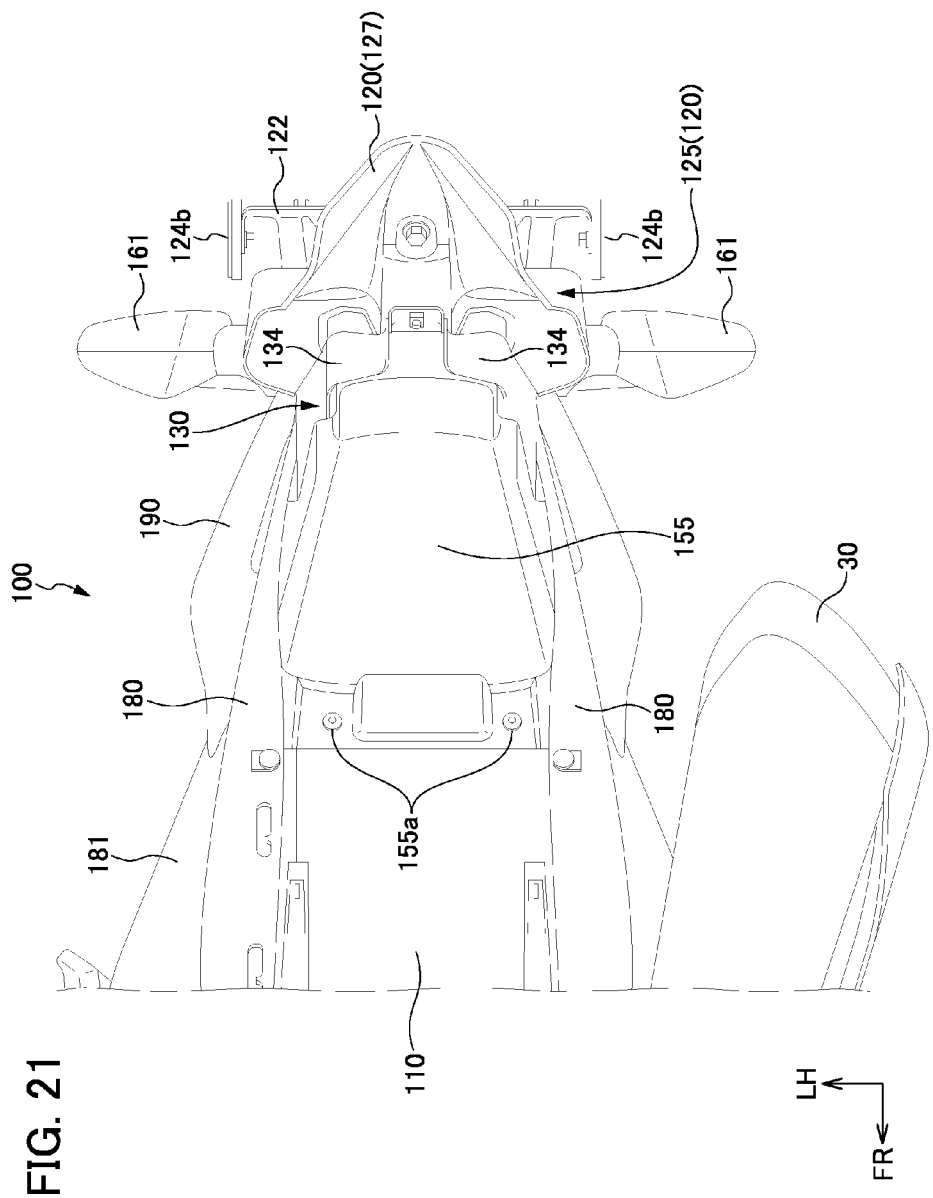
FIG. 21 is a bottom view showing the rear portion structure with the under cover mounted.

FIG. 18 is a perspective view showing the rear portion structure with an under cover removed. FIG. 19 is a bottom view showing the rear portion structure with the under cover removed. FIG. 20 is a perspective view showing the rear portion structure with the under cover mounted. FIG. 21 is a bottom view showing the rear portion structure with the under cover mounted.

As shown in FIGS. 3 to 21, the rear portion structure 100 serving as the rear portion structure of the motorcycle 1 of the present embodiment includes: a fender main body 110 that is fixed to the rear portion of the chassis frame 5, and disposed above the rear wheel 17; a fender hanging portion 120; a support stay 130; a tail light 150 provided above the support stay 130 and having a bulb 150a; a harness 167 that provides electricity to the bulb 150a of the tail light 150; an under cover 155 that covers the support stay 130 from below; auxiliary lights 160 provided to the fender hanging portion 120; a harness 168 that supplies electricity to the auxiliary lights 160; a rear-center cover 170; and a pair of rear-side covers 180.

First, the fender main body 110 will be explained. The fender main body 110 is formed in a bottomed box shape with an upside opened, as shown in FIGS. 15 to 19.

A detailed illustration is omitted; however, the fender main body 110 extends from substantially the central part of the chassis to above a rear end of the muffler 30 in a side view. The fender main body 110 is fixed to the rear portion of the chassis frame 5, and is disposed between the pair of seat rails 8 and the pair of rear stays 10. The fender main body 110 is fixed at a fastening portion 111 (refer to FIGS. 18 and 19) and a front portion of the fender main body 110 to the chassis frame 5. As shown in FIGS. 18 and 19, a pair of pilot holes 110a in the vehicle width direction is opened at the rear portion of the fender main body 110. Resin clips 155a (refer to FIGS. 20 and 21) are inserted in the pilot holes 110a. Grips 190 to be held by a passenger, etc. are provided to the chassis frame 5 in the vicinity of a rear end of the fender main body 110.

Next, the fender hanging portion 120 will be explained while mainly referencing FIGS. 3 to 5.

The fender hanging portion 120 covers above the rear portion of the rear wheel 17 from behind, as shown in FIG. 3. The fender hanging portion 120 is molded from synthetic resin or the like. The fender hanging portion 120 is formed separately from the fender main body 110.

The auxiliary lights 160, license plate 121 and reflectors 124a, 124b are provided to the fender hanging portion 120, as shown in FIGS. 3 and 4.

The auxiliary lights 160 are configured from a left and right pair of rear turn signals 161, and a license light 163. The rear turn signals 161 are configured to be able to flash, and notify the surroundings of a course change or the like of the motorcycle 1. The license light 163 is disposed at a central part of the fender hanging portion 120 in the vehicle width direction, and illuminates the license plate 121.

Electricity is supplied to the auxiliary lights 160 configured in this way, from a battery (not illustrated) equipped in the chassis and through the harness 168 (refer to FIGS. 12 and 13). The harness 168 is disposed in the gap formed between the outside of the support stay 130 and the inside of the under cover 155, as shown in FIG. 12.

The fender hanging portion 120 will be explained in further detail. As shown in FIG. 5, the fender hanging portion 120 includes an upper hanging part 125, and a lower hanging part 127 that extends downwards from the upper hanging part 125 and obliquely rearwards.

The upper hanging part 125 is formed in a substantially rectangular shape in a plan view, as shown in FIGS. 5 and 12, and is formed in a substantially triangular shape in a side view, as shown in FIGS. 5 and 15.

As shown in FIGS. 4 and 5, the pair of rear turn signals 161 is fixed to a lateral side of the upper hanger part 125 in the vehicle width direction. The license light 163 is fixed through a license light spacer 164 (not illustrated in FIG. 5) to a central part on a rear side of the upper hanger part 125. The reflector 124a is fixed through a reflector spacer 165 (not illustrated in FIG. 5) below the license light 163.

Next, the configuration of a rear face of the lower hanging part 127 will be explained while referencing FIGS. 4 and 5. The lower hanging part 127 is formed in a substantially downpointing triangular shape in a rear view, as shown in FIGS. 4 and 5. As shown in FIG. 5, a left and right pair of mounting holes 126 in a rear view is provided in an upper portion of the lower hanging part 127. A mounting hole 126a is provided in a central part of the lower hanging part 127 in the height direction. A mounting hole (not illustrated) for mounting a screw 141 is provided between the pair of mounting holes 126.

A left and right pair of stay upper-portion mounting bolts 122a (refer to FIG. 4) is inserted into the mounting holes 126. A stay lower-portion mounting bolt 122b (refer to FIG. 4) is inserted in the mounting hole 126a. The stay-upper mounting bolts 122a fasten an upper portion of the license-plate stay 122 to an upper portion of the lower hanging part 127 by threading with nuts (not illustrated) at the positions of the mounting holes 126. The stay-lower mounting bolt 122b fastens a lower portion of the license-plate stay 122 to a central part of the lower hanging part 127 in the height direction, by threading with a nut (not illustrated) at the position of the mounting hole 126a. The screw 141 fastens the fender hanging portion 120 to a connecting stay portion 135 (described later) of the support stay 130.

The license plate 121 and left and right pair of reflectors 124b are fixed through the license-plate stay 122 to a rear face of the lower hanging part 127 configured in the way. The license-plate stay 122 adjusts the mounting angle of the license plate 121 relative to the lower hanging part 127, as shown in FIGS. 4 and 15. More specifically, the upper portion of the license-plate stay 122 projects greatly rearwards in a side view, as shown in FIG. 15. The lower portion of the license-plate stay 122 projects slightly rearwards in a side view. The upper portion of the license plate 121 is mounted to the license-plate stay 122 by a left and right pair of license-plate mounting bolts 122c. The license plate 121 is thereby supported from the license-plate stay 122 at an attitude leaning forward slightly from a vertical plane.

As shown in FIG. 4, a vibration damping rubber 123 is mounted to a central lower portion of the license-plate stay 122 in a rear view. The vibration damping rubber 123 is arranged so as to abut a back face (forward face) of the lower portion of the license plate 121. The vibration damping rubber 123 suppresses vibration of the license plate 121.

Next, the configuration of the back face (forward face) of the lower hanging part 127 will be explained while referencing FIGS. 6, 7 and 18. As shown in FIGS. 6, 7 and 18, the upper rib part 128 and the pair of lower rib parts 129 projecting forwards are included on the back face of the lower hanging part 127.

The upper rib part 128 is formed in a plate shape, and is arranged at a central part in the vehicle width direction on the back face of the lower hanging part 127. The cross section of the pair of lower rib parts 129 in the vehicle width direction is formed in a substantially T shape. The pair of lower rib parts 129 is arranged to be separated to the left and right below the upper rib part 128. A rear end of the under cover 155 is inserted and locked in a gap formed by the upper rib part 128 and the pair of lower rib parts 129.

Next, the support stay 130 will be explained while referencing FIGS. 5 to 13. As shown in FIGS. 8, 9 and 12, the support stay 130 is fixed to a rear-end frame portion 5a serving as a rear end of the chassis frame 5. The support stay 130 extends substantially horizontally from the rear-end frame portion 5a rearwards, and supports the fender hanging portion 120. The rear-end frame portion 5a is formed in a substantially trapezoidal shape and ring shape in a plan view, as shown in FIG. 9. The rear-end frame portion 5a is formed from a plate of steel, for example.

As shown in FIG. 10, the support stay 130 includes a pair of rod members 131 that are arranged in parallel in the vehicle width direction and extend in a vehicle front-rear direction; a plate member 132 that joins the pair of rod members 131; a pair of tail-light mounting stay portions 133 that mounts the tail light 150 (refer to FIG. 14) to the support stay 130; a pair of fender-hanging portion stay portions 134 that supports the fender hanging portion 120; and a connecting stay portion 135 that connects the pair of fender-hanging portion stay portions 134.

As shown in FIGS. 10 and 11, the rod members 131 are formed from hollow steel pipe, for example. The rod members 131 are formed to bend in a substantially wide-V shape in a plan view. The pair of rod members 131 slopes so as to approach each other towards the rear, and then extend in parallel towards the rear in a plan view. The harness 167 supplying electricity to the bulb 150a of the tail light 150 is disposed between the pair of rod members 131, thereby achieving effective utilization of free space.

As shown in FIGS. 10 and 11, the plate member 132 is formed from a band plate of steel, for example. The plate member 132 joins a substantially center vicinity of the rod members 131 in the front-rear direction by welding or the like. The plate member 132 has a middle-fastening through hole 132a. A middle-fastening bolt 139 (refer to FIG. 9) is inserted in the middle-fastening through hole 132a. A nut 139a (refer to FIG. 18) threads to the middle-fastening bolt 139. The middle-fastening through hole 132a configures a middle-fastening portion 138 (refer to FIG. 9) along with the middle-fastening bolt 139 and nut 139a.

As shown in FIGS. 10 and 11, the tail-light mounting stay portions 133 are formed by folding plates of steel to a substantially right angle, for example, and are provided at a front end of the rod members 131. The tail-light mounting stay portions 133 have an locking hole 133a and a front-fastening through hole 133b.

Elastic members 149 (refer to FIG. 5) are installed in the locking holes 133a. Locking projections 151 (refer to FIG. 14) of the tail light 150 are fitted into the elastic members 149. A front portion of the tail light 150 is thereby locked.

A front-fastening bolt 136 (refer to FIG. 9) is inserted in the front-fastening through hole 133b. The front-fastening bolt 136 threads with a nut 136a (refer to FIG. 18). The front-fastening through hole 133b configures a front-fastening portion 137 (refer to FIG. 9) along with the front-fastening bolt 136 and nut 136a.

The fender-hanging portion stay portion 134 is formed to extend from a rear end of the rod members 131 to outside in the vehicle width direction, and then to extend downwards, and further to extend inside in the vehicle width direction, and then extend downwards, as shown in FIGS. 8 to 11. The fender-hanging portion stay portion 134 is formed by folding steel plate, for example.

As shown in FIGS. 18 and 19, the fender hanging portion 120 is fixed by the screw 141 (described later) to the fender-hanging portion stay portion 134. In addition, the rear turn signals 161 are fixed to lateral sides of the fender-hanging portion stay portion 134 in the vehicle width direction, as shown in FIG. 11. In FIG. 11, illustration of the fender hanging portion 120 is omitted for convenience of explanation. The rear turn signals 161 are fastened to the fender-hanging portion stay portion 134 by way of threaded parts 161a.

The connecting stay portion 135 connects the lower end of the pair of fender-hanging portion stay portions 134, as shown in FIGS. 8 to 11. The connecting stay portion 135 is formed by folding a thin plate such as a steel plate in a substantially U shape, for example.

The connecting stay portion 135 has a through hole 135a, as shown in FIGS. 10 and 11. The screw 141 (refer to FIGS. 5 and 18) is inserted in the through hole 135a. The screw 141 fastens the fender hanging portion 120 (lower hanging part 127) to the connecting stay portion 135.

In FIG. 10, the distance between the center of the front-fastening through hole 133b of the support stay 130 and the center of the through hole 135a is defined as K1.

In addition, as shown in FIG. 9, the support stay 130 is fastened to the rear-end frame portion 5a (chassis frame 5) at the pair of front-fastening portions 137 and middle-fastening portion 138. The pair of front-fastening portions 137 is provided to a front portion of the support stay 130 to be separated in the vehicle width direction. The middle-fastening portion 138 is provided at a substantially middle part of the support stay 130 in the front-rear direction.

The rear-end frame portion 5a of the chassis frame 5 has a maintenance opening portion 140 in a region surrounded by the pair of front-fastening portions 137 and the middle-fastening portion 138, as shown in FIG. 9. The maintenance opening portion 140 is disposed facing the bulb 150a (refer to FIG. 19) of the tail light 150 or the like.

The tail light 150 is provided above the support stay 130, as shown in FIGS. 14 to 16. Locking projections 151, 152 are provided to a front portion of the tail light 150. The locking projection 151 is fitted through the elastic member 149 (refer to FIG. 5) to the locking hole 133a of tail-light mounting stay portion 133. The locking projection 152 is locked to a locking piece 180b of the rear-side cover 180, as shown in FIG. 16. The locking piece 180b is installed to project at an inner face of the rear-side cover 180. The tail light 150 can thereby easily lock to the support stay 130 and rear-side cover 180.

Next, the under cover 155 will be explained. As shown in FIGS. 12, 20 and 21, the under cover 155 covers the support stay 130 from below. The under cover 155 is formed in a substantially trapezoidal shape in a plan view, and becomes gradually narrower towards the rear of the chassis. The rear end of the under cover 155 extends downwards and obliquely rearwards in a side view.

The under cover 155 is fixed to the front end of the fender hanging portion 120 and the rear end of the fender main body 110 to be detachable, as shown in FIGS. 12, 20 and 21. More specifically, as shown in FIGS. 20 and 21, the front portion of the under cover 155 is fixed to the rear portion of the fender main body 110 by inserting the resin clips 155a into the pilot holes 110a in the rear portion of the fender main body 110. The rear portion of the under cover 155 is inserted into the fender-hanging portion stay portions 134, 134 of the support stay 130, as shown in FIGS. 20 and 21. By configuring in this way, the under cover 155 is joined to the front portion of the fender hanging portion 120 and the rear portion of the fender main body 110. The harness 168 of the auxiliary lights 160 is disposed in the gap formed outside of the support stay 130 and inside of the under cover 155 (described later), as shown in FIG. 12.

Next, the rear-center cover 170 will be explained. The rear-center cover 170 is disposed between the tail light 150 and the support stay 130 so as to abut an upper face of the fender hanging portion 120, as shown in FIG. 15. The rear-center cover 170 covers a lower portion of the tail light 150 and an upper portion of the support stay 130.

The rear-center cover 170 has fastening portions 171 on both sides thereof in the vehicle width direction, as shown in FIGS. 13 and 14. The fastening portions 171 are fastened at predetermined locations on the rear-side covers 180 (described later).

Next, the rear-side covers 180 will be explained. The rear-side covers 180 form a part of the rear cowl 94 along with outer rear-side covers 181, as shown in FIGS. 3, 4 and 16. The rear-side covers 180 are mounted at both ends in the vehicle width direction of the rear-center cover 170, and cover lateral sides of the tail light 150 and lateral sides of the rear portion of the chassis frame 5.

The rear-side covers 180 have the locking holes 180a at an upper face on both ends thereof in the vehicle width direction, as shown in FIG. 16. The rear-side covers 180 are fastened with the rear-center cover 170 by the fastening portions 171 (refer to FIGS. 13 and 14).

The rear-side covers 180 configured in this way are disposed so that a rear end thereof overlaps at an upper portion of the fender hanging portion 120 from outside in a side view, as shown in FIGS. 3 and 16. In addition, a rear-upper-center cover 182 (described later) is provided between the pair of rear-side covers 180, as shown in FIGS. 4 and 17.

Next, the rear-upper-center cover 182 will be explained. The rear-upper-center cover 182 covers an upper face of the tail light 150, as shown in FIGS. 3 and 17. The rear-upper-center cover 182 has locking claws (not illustrated) at a back face side thereof on both ends in the vehicle width direction. The locking claw is locked in the locking hole 180a (refer to FIG. 16) of the rear-side cover 180.

In addition, the rear-upper-center cover 182 is fastened at fastening portions 180c at a front end thereof with the rear-side covers 180, as shown in FIG. 17. The rear-upper-center cover 182 is thereby fixed to the rear-side covers 180.

Figure 22:
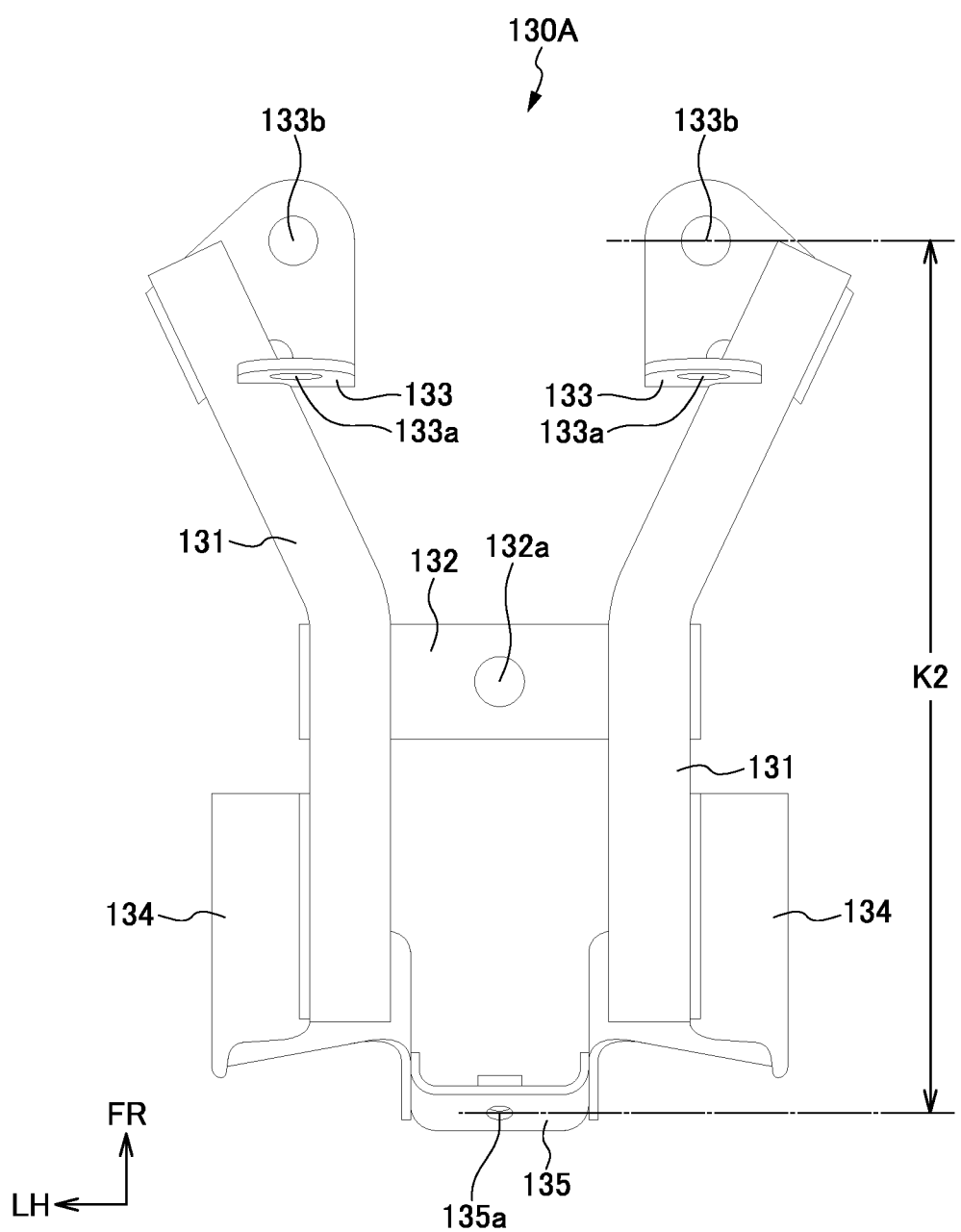
FIG. 22 is a plan view showing a support stay formed to be shorter than the support stay shown in FIG. 10.
Figure 23:
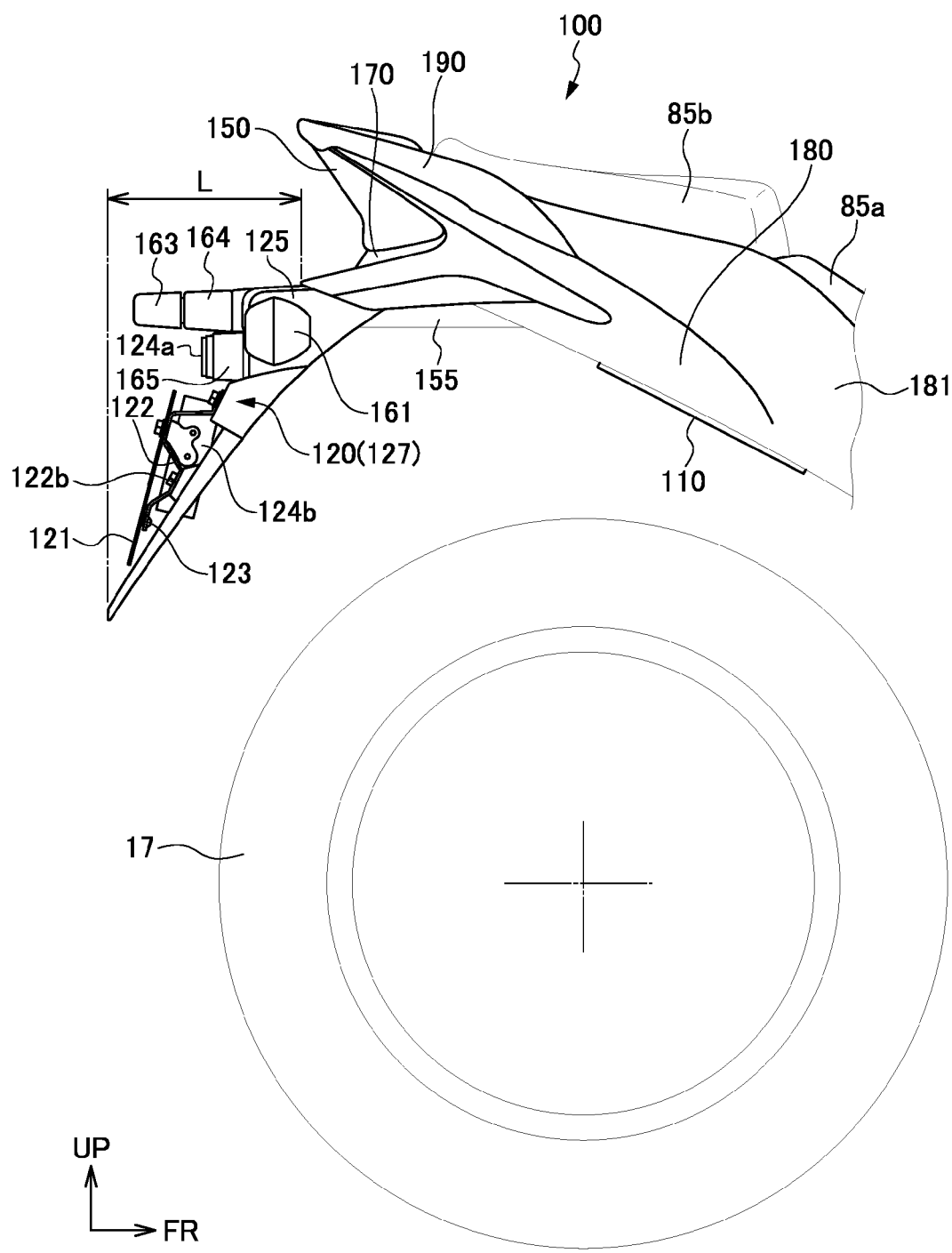
FIG. 23 is a right-side view showing the rear portion structure equipped with the support stay shown in FIG. 10.

Next, a rear portion structure 100A equipped with a support stay 130A having a shorter length in the front-rear direction than the support stay 130 shown in FIG. 10 will be explained while referencing FIGS. 22 to 24. FIG. 22 is a plan view showing the support stay 130A formed to be shorter than the support stay 130 shown in FIG. 10. FIG. 23 is a right-side view showing the rear portion structure 100 equipped with the support stay 130 shown in FIG. 10.

FIG. 23 shows the rear portion structure 100 applying the support stay 130 having a larger distance K1 to a vehicle model of long wheel base. FIG. 24 is a right-side view showing the rear portion structure 100A equipped with the support stay 130A shown in FIG. 22. FIG. 24 shows the rear portion structure 100A applying the support stay 130A having a smaller distance K2 (described later) to a vehicle model of short wheel base.

As shown in FIGS. 10 and 22, the support stay 130A mainly differs from the support stay 130 in the length in the front-rear direction, and other configurations thereof are substantially the same. In addition, the configuration of the rear portion structure 100A is the same as the configuration of the rear portion structure 100. As a result, the same reference symbols are affixed to configurations of the support stay 130A and rear portion structure 100A that are the same as the support stay 130 and rear portion structure 100, and detailed explanations thereof will be omitted.

In FIG. 22, the distance between the center of the front-fastening through hole 133b of the support stay 130A and the center of the through hole 135a is defined as K2 (<K1). In addition, in the rear portion structure 100 shown in FIG. 23, a projecting distance of the fender hanging portion 120 from the rear end of the rear-side covers 180 is defined as L. Furthermore, in the rear portion structure 100A shown in FIG. 24, the projecting distance of the fender hanging portion 120 from the rear end of the rear-side covers 180 is defined as S.

The distance K2 of the support stay 130A shown in FIG. 22 is shorter than the distance K1 of the support stay 130 shown in FIG. 10. As described earlier, the support stay 130A and the support stay 130 are fixed to the rear-end frame portion 5a of the chassis frame 5, and support the fender hanging portion 120 by extending from the rear-end frame portion 5a substantially horizontally rearwards. As a result, the projecting distance S of the rear portion structure 100A shown in FIG. 24 is shorter than the projecting distance L of the rear portion structure 100 shown in FIG. 23.

Figure 24:
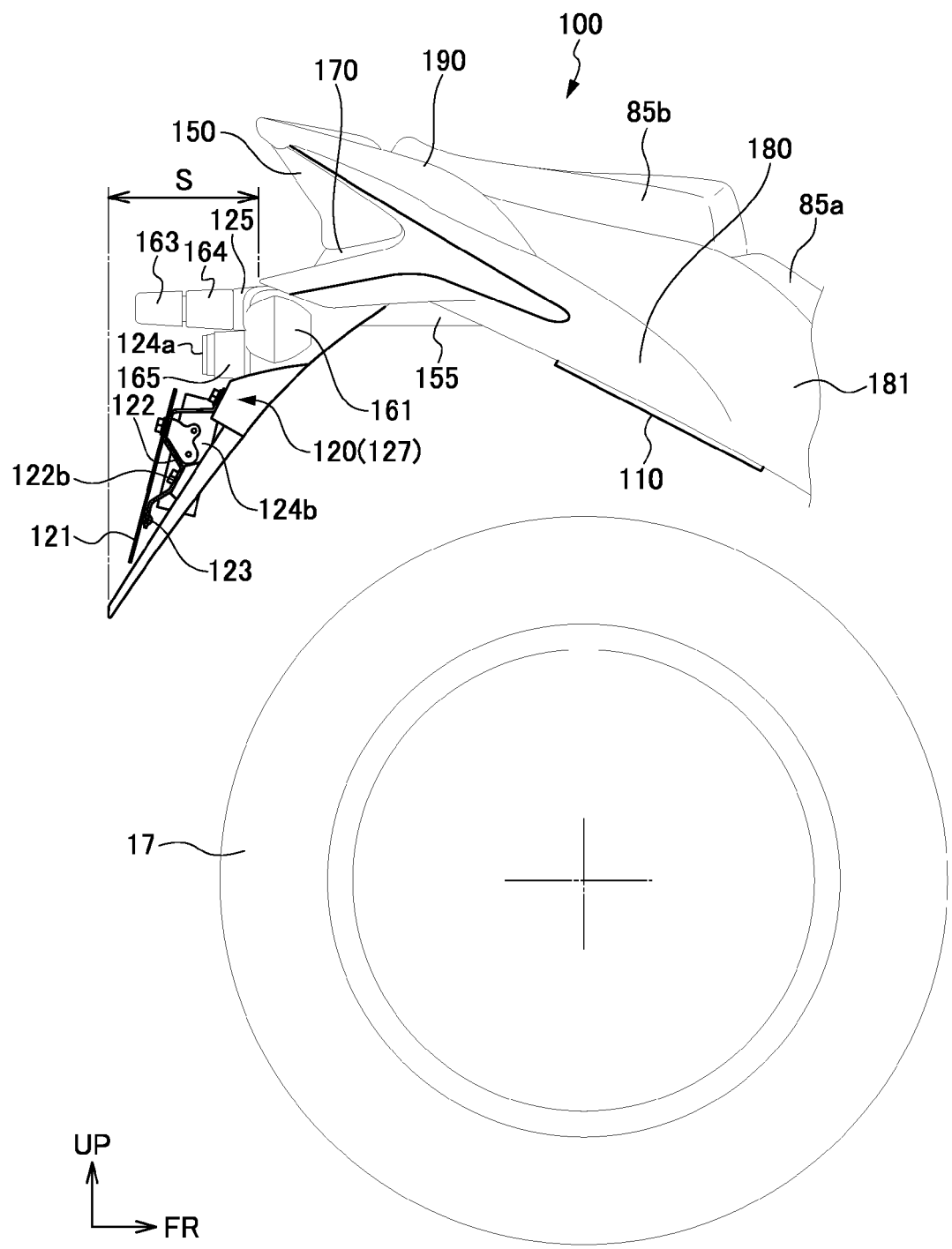
FIG. 24 is a right-side view showing a rear portion structure equipped with the support stay shown in FIG. 22.

In addition, when comparing the arrangement angles (angle sloping rearwards and obliquely downwards) of the fender hanging portion 120 relative to the rear-side covers 180 for the rear portion structure 100 shown in FIG. 23 and the rear portion structure 100A shown in FIG. 24, respectively, in the rear portion structure 100A shown in FIG. 24, both are substantially the same. In other words, it is found that the external shapes of the rear portion structure 100 and the rear portion structure 100A are substantially the same.

By using the support stays 130, 130a differing in length for a plurality of vehicle models having different wheel bases in this way, it is possible to achieve universalization of components without changing the fixing positions of the fender main body 110 or fender hanging portion 120, and the external shape can be made substantially the same.

Each of the effects indicated below is exerted according to the rear portion structure 100 of the motorcycle 1 of the first embodiment explained above.

The rear portion structure 100 of the motorcycle 1 of the present embodiment includes the chassis frame 5; the rear wheel 17 disposed below the rear portion of the chassis frame 5; the fender main body 110 fixed to the rear portion of the chassis frame 5 and disposed above the rear wheel 17; the fender hanging portion 120 configured separately from the fender main body 110 and covering at least part of the rear wheel 17 from behind; and the support stay 130 fixed to the rear end of the chassis frame 5, extending substantially horizontally from the rear end rearwards and supporting the fender hanging portion 120.

As a result, it is possible to change the support position of the fender hanging portion 120 by the support stay 130. Therefore, it is possible to achieve universalization of components for a plurality of vehicle models having different wheel bases, without changing the fixing positions of the fender main body 110 and fender hanging portion 120. In addition, since the formation of a plurality of fixing locations for dealing with changing the fixing positions of the fender hanging portion 120 relative to the fender main body 110 becomes unnecessary, it is possible to achieve a weight reduction in the rear portion support 100 and a reduction in cost.

In addition, the support stay 130 supports the fender hanging portion 120 by extending substantially horizontally from the rear end of the chassis frame 5 rearwards. As a result, even if changing the length of the support stay 130 for a plurality of vehicle models having different wheel bases, the position of the fender hanging portion 120 in the height direction will be substantially the same, whereby it is possible to make the external shape of the motorcycle 1 substantially the same.

In addition, the rear portion structure 100 of the motorcycle 1 of the present embodiment includes the tail light 150 provided above the support stay 130, and the under cover 155 that is fixed to the front portion of the fender hanging portion 120 and the rear portion of the fender main body 110 to be detachable, and covers the rear support 130 from below.

As a result, even in a case of the position of the fender hanging portion 120 in the front-rear direction being changed, it is possible to easily cover the support stay 130 from below by the under cover 155. In addition, by removing the under cover 155 from the part, it is possible to perform maintenance such as replacement or the like of the bulb 150a of the tail light 150. Therefore, it is possible to universalize structures such as of the fender hanging portion 120 or the like, without increasing the number of components.

In addition, in the rear portion structure 100 of the motorcycle 1 of the present embodiment, the support stay 130 includes the pair of front-fastening portions 137 provided to the front portion thereof to be separated in the vehicle width direction and fastened to the chassis frame 5, and the middle-fastening portion 138 provided at substantially the middle of the support stay 130 in the front-rear direction and fastened to the chassis frame 5. The chassis frame 5 includes the maintenance opening portion 140 in a region surrounded by the pair of front-fastening portions 137 and the middle-fastening portion 138.

As a result, the support stay 130 is fastened at the three places (3 points) of the pair of front-fastening portions 137 and the middle-fastening portion 138. Therefore, it is possible to raise the fastening strength of the support stay 130. In addition, the chassis frame 5 has the maintenance opening portion 140 at the rear portion thereof. As a result, it is possible to achieve centralization of mass by a weight reduction in the rear portion of vehicle. In addition, it is possible to perform maintenance such as replacement or the like of the bulb 150a of the tail light 150 using the maintenance opening portion 140.

Furthermore, in the rear portion structure 100 of the motorcycle 1 of the present embodiment, the support stay 130 has the tail-light mounting stay portion 133 that mounts the tail light 150 to the support stay 130.

As a result, it is possible to make a sub-assembly of the tail light 150 to the tail-light mounting stay portion 133 of the support stay 130 in advance. The support stay 130 can thereby be assembled to the chassis frame 5 moving down a main line of an assembly process, in an assembly state including the fender hanging portion 120. Therefore, the assembling process can be simplified, whereby productivity of the motorcycle 1 can be improved.

In addition, the rear portion structure 100 of the motorcycle 1 of the present embodiment further includes the auxiliary lights 160 provided to the fender hanging portion 120, and the harnesses 167, 168 that supply electricity to the auxiliary lights 160 and the tail light 150. The support stay 130 has a pair of rod members 131 disposed in parallel in the vehicle width direction and extending in the vehicle front-rear direction, and the plate member 132 joining the pair of rob members 131. The harness 167 is disposed between the pair of rod members 131.

As a result, the harness 167 can be disposed effectively using the space formed in the support stay 130 (between the pair of rod members 131). Therefore, it is possible to achieve a size reduction in the rear portion structure 100 of the motorcycle 1, as well as being able to protect the harness 167 with the support 130, the fender hanging portion 120 and under cover 155. In addition, since it can be made in an assembly state also including the auxiliary lights 160, the productivity can be further improved.

Furthermore, the rear portion structure 100 of the motorcycle 1 of the present embodiment includes the rear-center cover 170 that is disposed between the tail light 150 and support stay 130 so as to abut an upper face of the fender hanging portion 120, and covers the lower portion of the tail light 150 and upper portion of the support stay 130.

As a result, it is possible to suppress exposure on the exterior of the harnesses 167, 168 and the support stay 130. Therefore, the harnesses 167, 168 and the support stay 130 can be protected. In addition, the rear-center cover 170 and the upper face of the fender hanging portion 120 merely abut without being fastened. As a result, even if changing the mounting position of the fender hanging portion 120, it is possible to create a sense of unity around the rear, without forming an abundance of fastening portions.

In addition, the rear portion structure 100 of the motorcycle 1 of the present embodiment includes, at both ends in the vehicle width direction of the rear-center cover 170, the pair of rear-side covers 180 covering lateral sides of the tail light 150 and lateral sides of the rear portion of the chassis frame 5. The rear end of the rear-side covers 180 is disposed so as to overlap the upper portion of the fender hanging portion 120 from outside in a side view.

As a result, it is possible to conceal a gap (clearance) created at an abutting position between the rear-center cover 170 and the upper face of the fender hanging portion 120. Therefore, even without fastening the rear-center cover 170 and fender hanging portion 120, it is possible to improve the aesthetics, and it is possible to achieve a reduction in the number of components and a weight reduction.

Although an embodiment of the present invention has been explained in the foregoing, the present invention is not to be limited to the aforementioned embodiment, and modifications thereto are possible where appropriate.

The embodiment has been explained with the license plate 121 being fixed to the lower hanging part 127 through the license-plate stay 122 (refer to FIG. 15), in order to adjust the mounting angle of the license plate 121 relative to the lower hanging part 127; however, it is not limited thereto.

Figure 25:
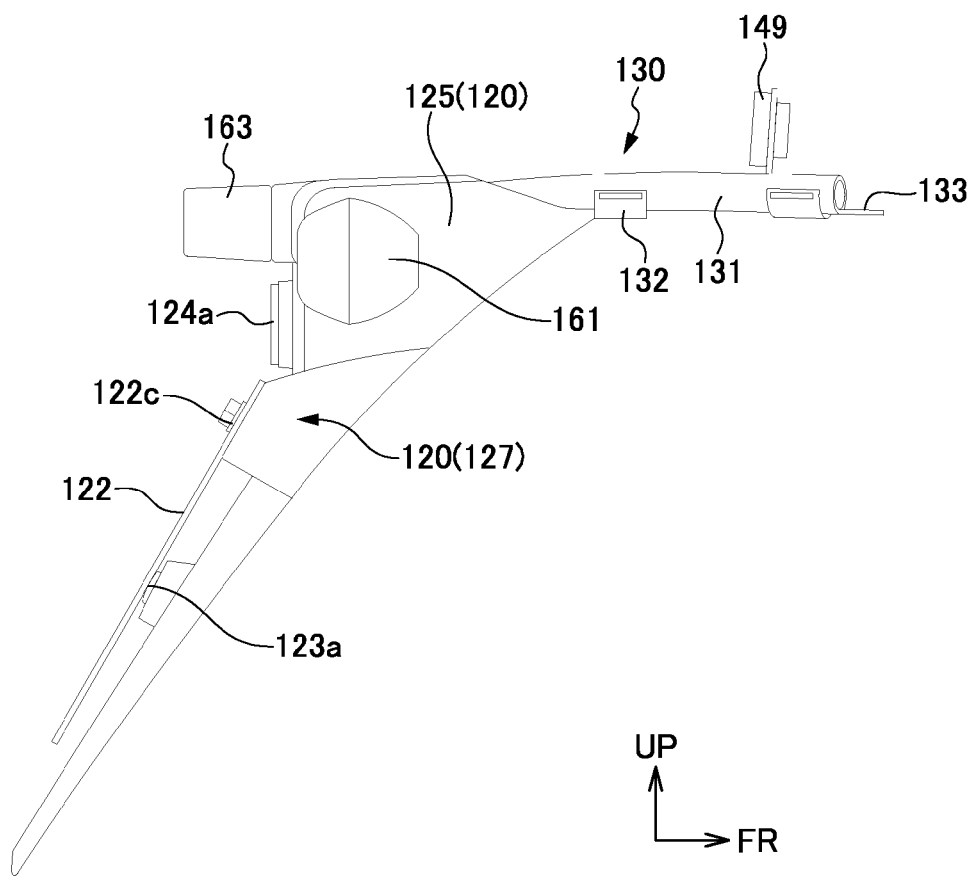
FIG. 25 is a right-side view showing another example mounting a license plate to the fender handing portion.

For example, as shown in FIG. 25, the license plate 121 may be directly fixed to the lower hanging part 127 without going through the license-plate stay 122. Herein, FIG. 25 is a right-side view showing another example mounting the license plate 121 to the fender hanging portion 120. In this case, a vibration damping rubber 123a can be mounted to the mounting hole 126a (refer to FIG. 5) of the lower hanging part 127. The upper portion of the license plate 121 is fixed to the lower hanging part 127, by fastening at the mounting holes 126 (refer to FIG. 5) of the lower hanging part 127 by way of the license-plate mounting bolts 122c and nuts (not illustrated).

As a result, it is possible to fix the license plate 121 to the lower hanging part 127 in a more sloped forward state than the license plate 121 shown in FIG. 15. In addition, it is possible to suppress vibration of the license plate 121 by way of the vibration damping rubber 123a.

Furthermore, although the present invention is applied to a so-called full-cowl type of motorcycle as a straddled vehicle in the present embodiment, it is not limited thereto. For example, the present invention may be applied to a three-wheeled straddled vehicle or four-wheeled all terrain vehicle, and may be applied to motorcycles and the like other than full-cowl type motorcycles. In other words, straddled vehicle includes all vehicles ridden by straddling the chassis.

The invention claimed is:

1. A motorcycle rear portion structure, comprising:
a chassis frame having a pair of seat rails on a left and right and a rear-end frame portion that joins a rear end of the pair of seat rails;
a rear wheel disposed below a rear portion of the chassis frame;
a fender main body that is fixed to the rear portion of the chassis frame and is disposed above the rear wheel;
a fender hanging portion that is configured to be separate from the fender main body and covers at least part of the rear wheel from behind;
a support stay that is fixed to a the rear-end frame portion, extends substantially horizontally from the rear-end frame portion rearwards, and supports the fender hanging portion; and
an under cover that covers the support stay from below,
wherein, among the fender main body and the fender hanging portion, only the fender hanging portion is fixed to the support stay, and
wherein the under cover is provided between the fender main body and the fender hanging portion.

2. The motorcycle rear portion structure according to claim 1, further comprising a tail light that is provided above the support stay,
wherein the under cover is fixed to a front portion of the fender hanging portion and a rear portion of the fender main body to be detachable.

3. The motorcycle rear portion structure according to claim 2,
wherein the support stay includes a pair of front-fastening portions that is provided at a front portion thereof to be separated in a vehicle width direction, and is fastened to the rear-end frame portion, and a middle-fastening portion that is provided at a substantially middle part of the support stay in a front-rear direction and is fastened to the rear-end frame portion, and
wherein the rear-end frame portion includes a maintenance opening portion at a region surrounded by the pair of front-fastening portions and the middle-fastening portion.

4. The motorcycle rear portion structure according to claim 2, wherein the support stay includes a tail-light mounting stay portion that mounts the tail light to the support stay.

5. The motorcycle rear portion structure according to claim 4, further comprising:

an auxiliary light provided to the fender hanging portion; and a harness that supplies electricity to the auxiliary light and the tail light, wherein the support stay includes a pair of rod members disposed in parallel in the vehicle width direction and extending in a vehicle front-rear direction, and a plate member joining the pair of rod members, and wherein at least a part of the harness is disposed between the pair of rod members.

6. The motorcycle rear portion structure according to claim 5, further comprising a rear-center cover that is disposed between the tail light and the support stay so as to abut an upper face of the fender hanging portion, and that covers a lower portion of the tail light and an upper portion of the support stay.

7. The motorcycle rear portion support according to claim 6, further comprising a pair of rear-side covers, at both ends of the rear-center cover in the vehicle width direction, covering lateral sides of the tail light and lateral sides of the rear portion of the chassis frame, wherein a rear end of the rear-side cover is disposed so as to overlap an upper portion of the fender hanging portion from outside in a side view.

* * * * *